(12) United States Patent
Meinherz et al.

(10) Patent No.: US 9,628,183 B2
(45) Date of Patent: Apr. 18, 2017

(54) TRANSCEIVER ELEMENT FOR AN OPTICAL UNIT OF A PHOTOELECTRIC BARRIER AND PHOTOELECTRIC LIGHT CURTAIN

(71) Applicant: CEDES SAFETY & AUTOMATION AG, Landquart (CH)

(72) Inventors: Carl Meinherz, Malans (CH); James Edward Dogul, Hudson, NH (US); George E. Rollins, Chelmsford, MA (US); Martin Hardegger, Sargans (CH); Christopher Walther, Wolfhalden (CH); Danilo Dorizzi, Klosters (CH)

(73) Assignee: Rockwell Automation Safety AG, Lanqguart (CH)

( * ) Notice: Subject to any disclaimer, the term of this patent is extended or adjusted under 35 U.S.C. 154(b) by 395 days.

(21) Appl. No.: 14/289,045

(22) Filed: May 28, 2014

(65) Prior Publication Data

US 2015/0288454 A1 Oct. 8, 2015

(30) Foreign Application Priority Data

May 28, 2013 (EP) ..................... 13169470

(51) Int. Cl.
*H04B 10/40* (2013.01)
*G01V 8/20* (2006.01)
(Continued)

(52) U.S. Cl.
CPC ............... *H04B 10/40* (2013.01); *G01V 8/20* (2013.01); *H04B 10/0795* (2013.01); *H04B 10/2575* (2013.01)

(58) Field of Classification Search
CPC .......... H04B 10/07957; H04B 10/0793; H04B 10/079; H04B 10/0773; H04B 10/0775;
(Continued)

(56) References Cited

U.S. PATENT DOCUMENTS

2009/0238563 A1* 9/2009 Fukashiro .......... H04B 10/0775
398/30
2010/0127158 A1 5/2010 Scheiber
(Continued)

FOREIGN PATENT DOCUMENTS

CN 102736121 A 10/2012
CN 202748895 U 2/2013
(Continued)

OTHER PUBLICATIONS

Partial European Search Report Dated Nov. 13, 2013; Application No. 13169470.5—(6) Pages.
(Continued)

*Primary Examiner* — Ted Wang
(74) *Attorney, Agent, or Firm* — Boyle Fredrickson, SC

(57) ABSTRACT

The present invention relates to a transceiver element for an optical unit of a photoelectric barrier to such a photoelectric barrier. In particular, a transceiver element comprises at least one optical sender, at least one optical receiver and a control element, wherein said control element comprises a driver unit for driving said at least one optical sender to emit radiation and at least one receiver unit for sensing and evaluating electrical signals generated by said optical receiver.

19 Claims, 21 Drawing Sheets

(51) Int. Cl.
 *H04B 10/079* (2013.01)
 *H04B 10/2575* (2013.01)
(58) Field of Classification Search
 CPC  H04B 10/0795; H04B 10/2575; H04B 10/40;
  H04Q 2011/0084; G01V 8/20
 See application file for complete search history.

(56) References Cited

U.S. PATENT DOCUMENTS

| | | | |
|---|---|---|---|
| 2012/0108928 A1* | 5/2012 | Tverskoy | A61B 5/0059 |
| | | | 600/324 |
| 2012/0205526 A1* | 8/2012 | Iwanaga | H04B 10/40 |
| | | | 250/227.11 |
| 2012/0267516 A1 | 10/2012 | Meinherz | |

FOREIGN PATENT DOCUMENTS

| | | | |
|---|---|---|---|
| EP | 1260950 A2 | 11/2002 | |
| EP | 2511737 A1 | 10/2012 | |
| WO | 01/69582 A1 | 9/2001 | |
| WO | 03001245 A1 | 3/2003 | |

OTHER PUBLICATIONS

Extended European Search Report Dated Apr. 7, 2014; Application No. 13169470.5—(12) Pages.
Chinese Patent Office Action dated Apr. 25, 2016 with English translation; Chinese Patent Application No. 201410228845.6—(21) pages.

* cited by examiner

TRANSCEIVER ELEMENT FOR AN OPTICAL UNIT OF A PHOTOELECTRIC BARRIER AND PHOTOELECTRIC LIGHT CURTAIN

CROSS-REFERENCE TO RELATED APPLICATIONS

This application claims priority to European Patent Application No EP 13 169 470.5, filed May 28, 2013, the entire content of which is incorporated herein by reference.

BACKGROUND OF THE INVENTION

The subject matter disclosed herein relates generally to light curtains and photoelectric barriers and, more specifically, to safety light curtains for monitoring a protective field. In particular, the present invention relates to a transceiver element for an optical unit of a photoelectric barrier and to such a photoelectric barrier.

Generally, photoelectric barriers, also referred to as light curtains or light grids, detect the movement or intrusion of objects into guarded zones, and more particularly, provide protection for human operators who are working with machines or other industrial equipment. Such photoelectric barriers can be formed by two or more optical units (also called bars, sticks, edges or strips), or by one optical unit interacting with a reflective component.

Light curtains employing infrared or visible light beams are used to provide operator safety in a variety of industrial applications. Light curtains typically are employed for operator protection around machinery, such as punch presses, brakes, molding machines, automatic assembly equipment, coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked by an opaque object, such as the operator's arm, a control circuit shuts the machine down, prevents the machine from cycling, or otherwise safeguards the area.

Usually, safety light curtains comprise two optical units, which are formed as two different constructional units, one of the optical units having the functionality of an emitter and one of a receiver. This dedicated architecture of an emitter and receiver, however, has several drawbacks.

Firstly, the fabrication costs are high, because each type of optical unit has to be fabricated differently. Further, due to the fact that the optical communication is only unidirectional, for example, from the sender to the receiver, the optical synchronization may be difficult and a transmission of communication information is possible only in one direction.

It has already been proposed to locate receivers and transmitters on each of the first and second optical units, as this is described in the European patent EP 1870734 B1. Here, the light curtain has two identical transmitting/receiving strips, to which transmitting and receiving units are fixed. The transmitting/receiving strips are placed opposite to each other with a protective field being formed between the strips. The transmitting/receiving strips are identically formed in control and evaluation units. The control and evaluation units have safety outputs, which are formed together as a switching channel. An identical power supply is provided for all the strips.

Furthermore, it is known from EP 2511737 A1 to provide a modular light curtain and optical unit for such a light curtain.

Most standard concepts use integrated circuits which are either dedicated to drive radiation emitters or to evaluate the signals from radiation receivers. Hence, for a transceiver element having emitters and receivers, either two different control elements are required or each of them has a part that is not used for the specific task, thus generating unnecessary costs.

Thus it would be desirable to overcome the above mentioned problems and to provide a transceiver element for use in photoelectric barriers that allows for a high flexibility and reliability and can be fabricated in a cost-effective way.

BRIEF DESCRIPTION OF THE INVENTION

The subject matter disclosed herein describes a transceiver element for an optical unit of a photoelectric barrier that has at least one optical sender and at least one optical receiver. The transceiver element includes a control element that has a driver unit for driving the at least one optical sender to emit radiation and has receiver circuitry for sensing and evaluating the electrical signals generated by the optical receiver. In other words one integrated circuit forming the control element handles both the receiving part and the emitting part of two radiation beams directed in opposing directions. According to various embodiments of the present invention, even more than just two beams, such as four, six or more can be integrated to be handled by one control element. Advantageously, the combined control element is used for varying number of beams and one type of control element is sufficient for building each desired light curtain architecture.

According to one aspect of the invention, the control element is fabricated as an integrated circuit, such as an application specific integrated circuit (ASIC). Alternatively, also a field programmable gate array (FPGA) design can be used. As is known to a person skilled in the art, ASICs have the advantage of a full custom capability, lower unit costs and a small form factor, whereas FPGAs have the advantage of a faster time to market and a simpler design cycle.

According to another aspect of the invention, the driver unit is operable to adjust an emission intensity of the optical sensor in response to a first setting signal. This feature has the advantage that the emitted radiation can be adjusted to different environmental conditions. Furthermore, by being able to operate, for instance, LEDs with an adjustable emitter current, the driver current may, for instance, be adjusted to external or internal temperature, variations, which is highly desirable, because LEDs have a heavily temperature dependent emitting intensity. On the other hand, by directly evaluating the measured incident radiation on the opposing side and sending back an electrical or optical signal indicative of the amount of incident radiation, the emission intensity can be adapted, for instance, for a front window pollution or ambient obscuring effects, such as dust or the like.

By controlling the LED current dependent on the temperature, the intensity can be controlled such that there is enough intensity at high temperatures on the one hand, and no elevated intensity at lower temperatures on the other hand. Too high intensities would, for example, cause side lobes or disturbances into adjacent light curtain systems.

According to yet another aspect of the present invention, the receiver unit of the control element is operable to adjust the sensitivity of the optical receiver in response to a second setting signal. In particular, in case of a high level of disturbances, for instance electromagnetic interferences or ambient light pulses, it is possible to reduce the receiver sensitivity such that a low operating range is used. On the other hand, the high receiver sensitivity can be used for long operating range systems where additional precautions have to be made against disturbances.

The first setting signal as well as the second setting signal can both be either received as an optical signal detected by the optical receiver or as an electrical signal received via a communication bus.

According to a further aspect of the invention, a comparator circuit such as a level comparator is used for the intensity detection at the receiver stage. A display LED or a similar means can be used to warn an operator if the intensity value is not within a predefined range. Each sensitivity level may have two comparator levels: a lower level for the detection limit and a higher level which represents the intensity level that is necessary for detecting a deterioration of the signals, for example, due to front window pollution during the operation of the system. The comparison and the output of a warning can be implemented directly at the transceiver element or at the central controller of the photoelectric barrier.

According to yet another aspect of the invention the transceiver element can communicate via a communication bus with a central controller and further transceiver elements. In this context it is advantageous if the communication on the bus connection is taking place only during times when the transceiving element is emitting radiation and is silent during the receiving phase. As a result, no digital signal transitions occur during the receiving phase. This signaling scheme allows for a reduced level of disturbances during the actual measurement procedure.

According to an exemplary embodiment of the present invention, a photoelectric barrier for monitoring a surveillance area comprises at least one transceiver element. It is contemplated that the system disclosed herein can be used with photoelectric barriers having first and second optical units each with at least one transceiver element according to the present invention. Optionally, systems where the second optical unit is replaced by a mere reflective unit can also include one or more transceiver elements.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
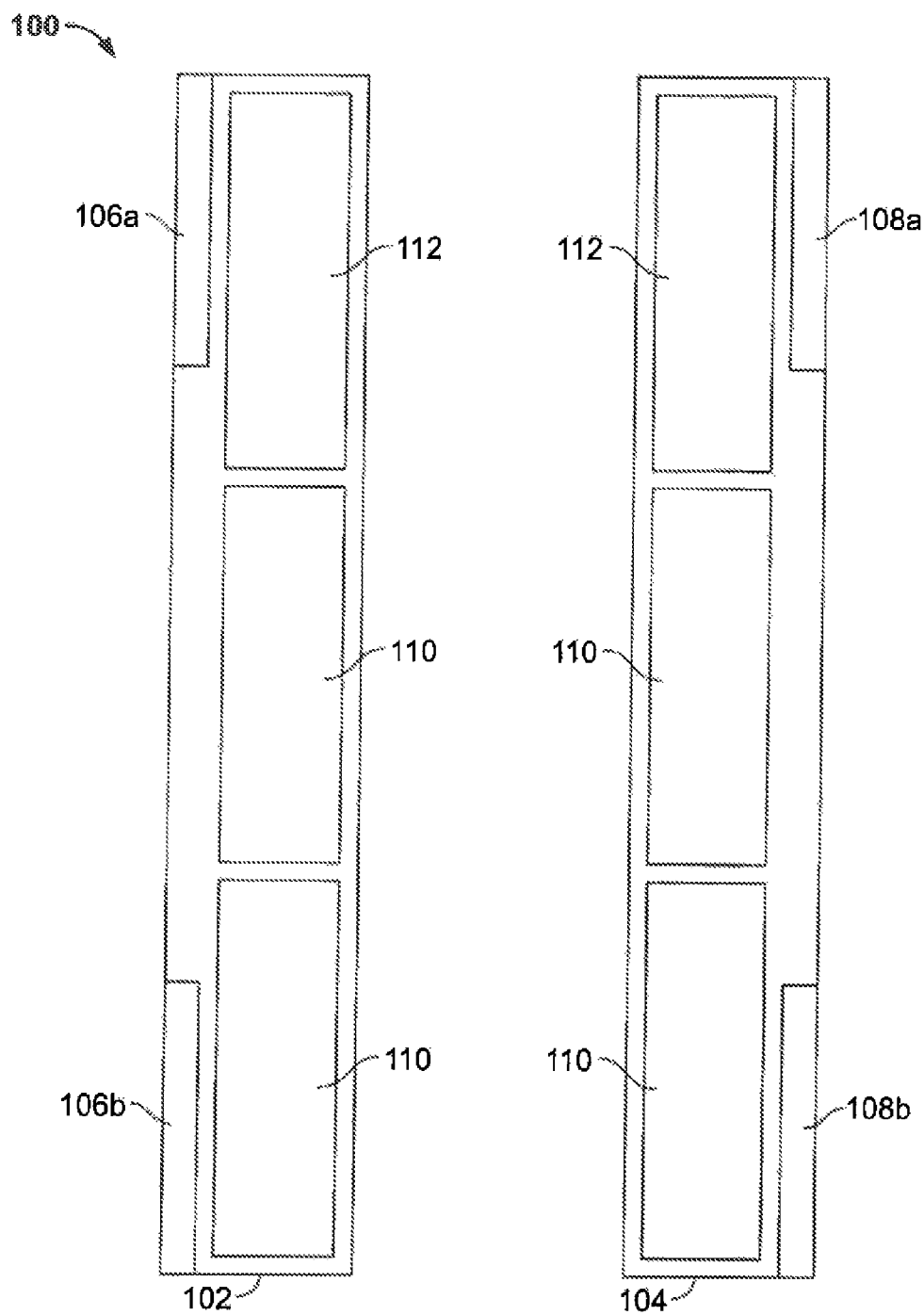
FIG. 1 shows a schematic representation of a light curtain having two optical units according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Referring now to FIG. 1, a schematic representation of a light curtain comprising two optical units is shown.

The light curtain 100 in this embodiment consists of two identical first and second optical units 102, 104, which form between each other a plurality of light bathers for monitoring a protective field. However, the ideas of the present invention are also applicable in systems which comprise more than two optical units. The optical units 102, 104 may for instance be formed according to the principles of the European patent application EP 2511737 A1, and may in particular use plug-in modules 106, 108 for defining their respective functionality.

According to the embodiment shown in FIG. 1, each optical unit 102, 104 comprises two identical modules 110 each having light emitting and light receiving elements. These optical nodules 110 are identically built for both optical units 102, 104. Each of the optical units 102, 104 further comprises at least one second optical module 112 that also comprises a micro controller providing the necessary intelligence to the optical unit 102, 104. Each of the modules 110, 112 may for instance have a height of about 150 mm. However; any other size or number of modules 110, 112 within each optical unit 102, 104 can also be used together with the present invention. Essentially, the first and second optical unit 102, 104 are identically built except for the plug-in modules 106a, 106b and 108a, 108b which are defining, the particular functionality of each of the optical units.

According to the present invention, each of the optical modules 110 comprises a plurality of optoelectronic components with their associated circuitry for emitting and sensing the radiation beams. These optoelectronic components are also referred to as "transceiver elements". The second optical module 112 contains the same optical functions and additionally, at least one micro controller and optionally electronic circuitry, such as an interface with an external connector. However, for using a synchronization method according to the present invention, the optoelectronic components do not necessarily have to be grouped in optical modules 110, 112.

Figure 2:
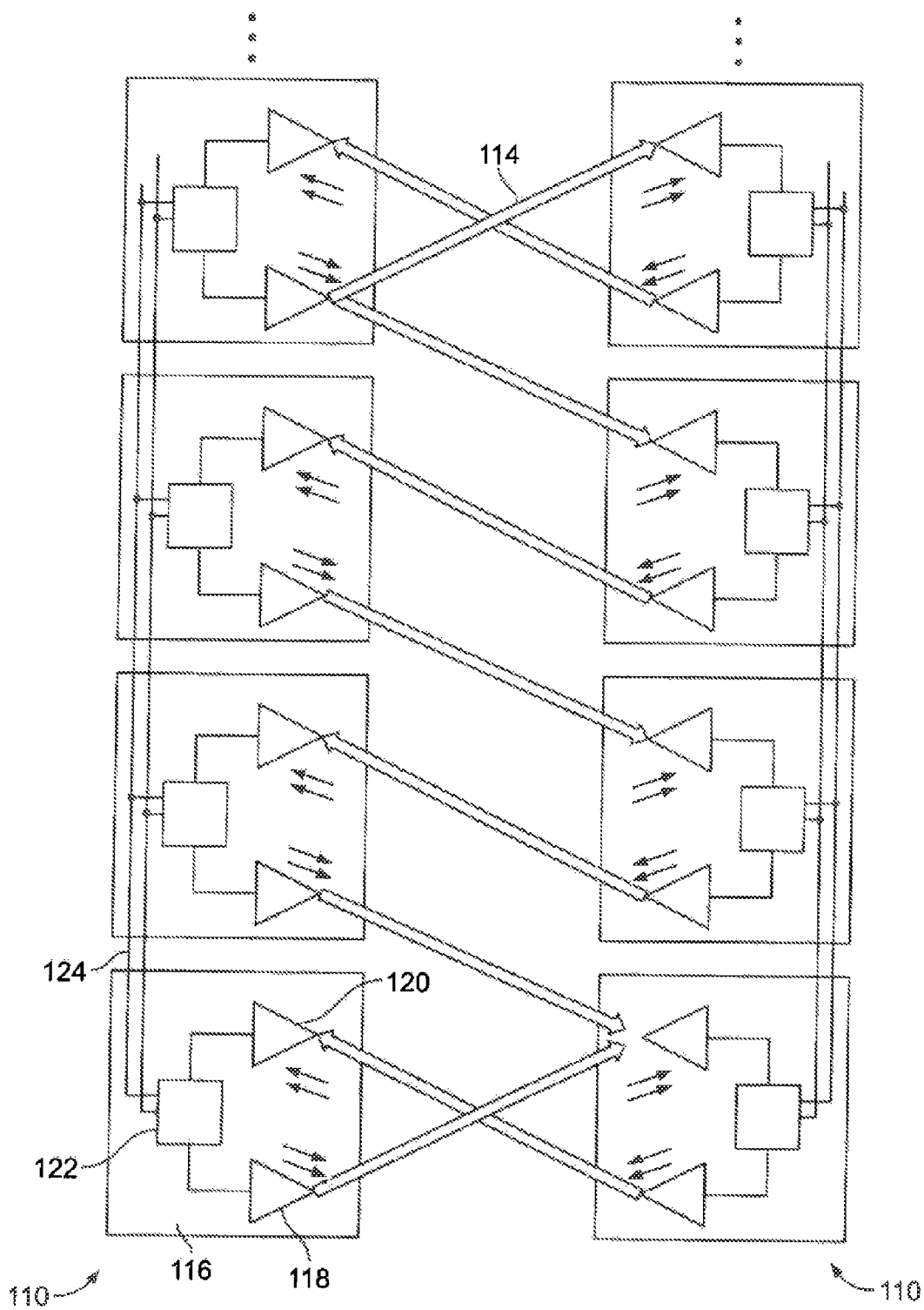
FIG. 2 shows a schematic representation of operation of a light curtain comprising two optical units according to one embodiment of the invention.

A more detailed view of a part of two opposing optical modules 110 is given with reference to FIG. 2. The light curtain may be formed by a linear array of radiation beams 114 which can either be infrared radiation with a wavelength between about 800 nm and 1000 nm, or visible light having a wavelength between about 620 nm and 750 nm.

The radiation beams 114 may for instance be activated sequentially, one beam at a time, from one peripheral end to the other peripheral end of each stick. Because each optical unit 102, 104 has transmitting and sensing photo elements, the scan through the light curtain activates every element sequentially and with an alternating direction, the beam being sent from the second optical unit 104 to the first optical unit 102 and back again. During such a scan sequence, the respective receiving stick sequentially detects the light from the predetermined emitting element to the corresponding receiving element. In order to allow for such a complex scan procedure, each optical unit 102, 104 is formed by a plurality of optoelectronic components 116 each comprising at least one light-emitting element 118 and at least one light-receiving element 120.

Each of the optoelectronic components 116 has a rather high degree of integrated intelligence in the form of a separate control element 122 which may for instance be formed as an integrated circuit, such as an application specific integrated circuit (ASIC). Each of the control elements 122 provides electronic circuitry for driving the at least one light-emitting element 118 and for processing signals generated by the at least one light-receiving element 120. In order to communicate with the higher level controller, each of the optoelectronic components 116 is connected to a communication bus 124.

According to the present invention, each transceiver element contains the driver and receiving circuitry which is needed for accurately performing the complex emitting and detecting sequences performed by the light curtain of FIGS. 1 and 2.

Figure 3:
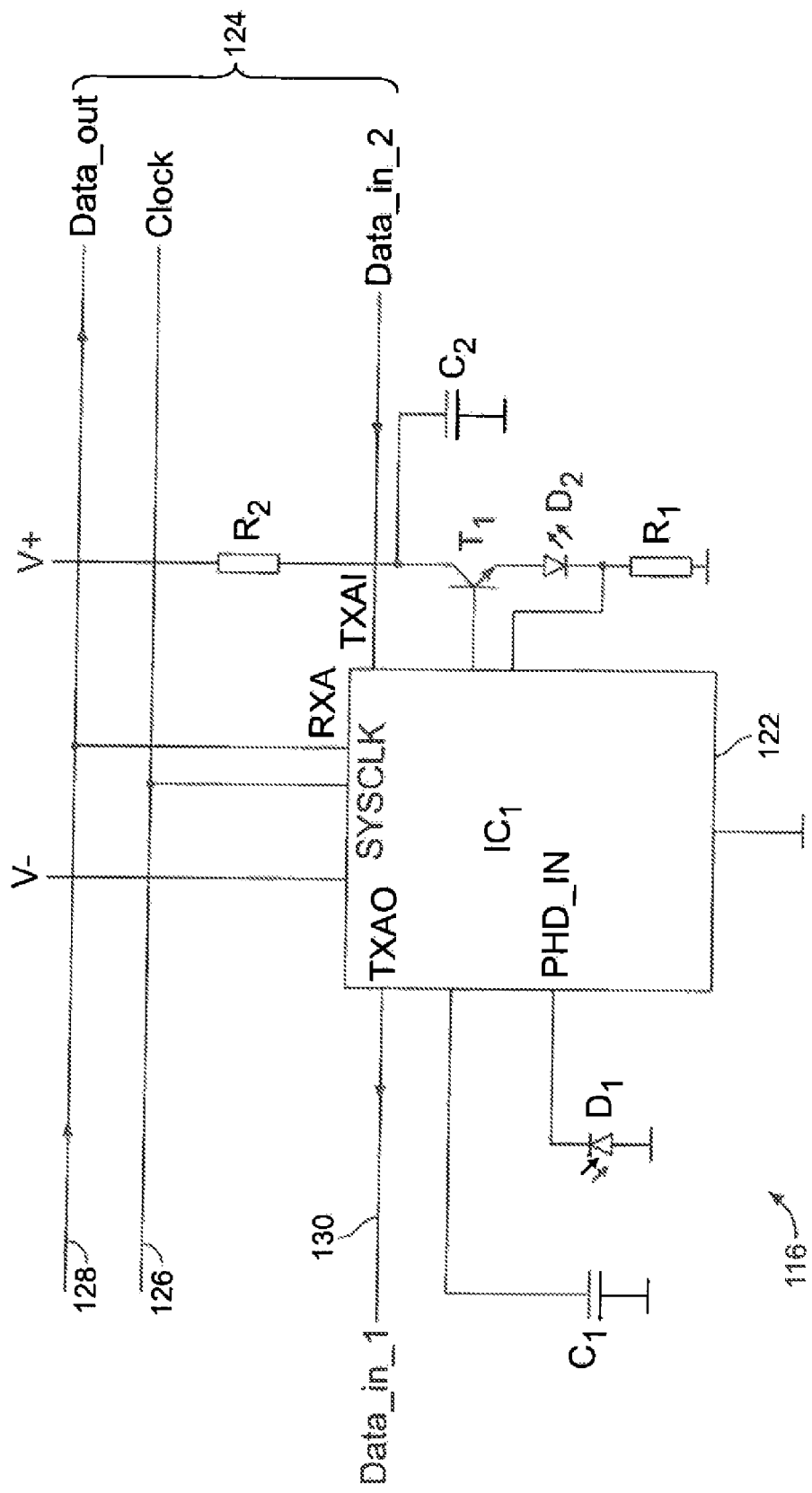
FIG. 3 shows a circuit diagram of an optoelectronic component according to one embodiment of the present invention.

FIG. 3 shows in a schematic representation one optoelectronic component 116 with its interconnection terminals and the control element 122. According to the illustrated embodiment of the invention, the optoelectronic component 116 comprises a light emitting element, such as a light emitting diode, LED, D2, and a light receiving element, such as a photo diode, D1. According to the present invention, the control element 122 may be connected via a communication bus 124 to the next following optoelectronic component or, in case that it is the one next to the controller of the optical unit, to the controller. The bus comprises a data-out line 128 which transports signals from the micro controller (the master of the system) to the control element 122. According to the embodiment shown in FIG. 3, the communication bus 124 between the micro controller functioning as the master and the plurality of control elements 122 is a serial bus based on three communication lines: a clock 126; a data-in line 130, and a data-out line 128. The global system clock 126 is controlled by the master; This clock is buffered on each control element 122 and provides the main clock for the functioning of the control element 122.

The data transmission line (data-out) is configured as a single bit unidirectional connection from the master to the control elements 122. The data-out line is a shared communication line out of the micro controller to all of the control elements 122. In other words, all control elements 122 are connected in parallel and the transmission line is buffered on each module if the plurality of optoelectronic components is grouped together in optical modules 110.

The data-in line 130 is another single bit unidirectional line for receiving data which is sent from the control elements 122 to the master. According to the embodiment shown in FIG. 3, the data-in line 130 is a daisy chain line which is passed on, from one control element 122 to the next. During normal operation, the control element receives data from the neighboring control element. An arrow gives the signal flow for this operation. On the following clock cycle the data are propagated to the next control element 122.

Generally, every communication is initiated by the master. A particular control element 122 may only transmit information onto the data-in line 130 after a request originated by the master has been recognized and validated. The response onto the data-in line 130 must then follow the particular bus protocol. Moreover, the communication line from the control elements 122 to the micro controller is a point-to-point communication bus which is synchronous to the single global system clock. That means that each control element 122 takes information from the previous control element and forwards the merged results of that data and its internal data to the next control element. With a configurable option to register the data in a flip flop and send it on the following clock.

Each, control element 122 is connected to a single power line (V+) which may for instance be a 12 V to 15 V power line. The control element 122 may also comprise internal power management blocks for regulating its own power supply.

The main functions of the optoelectronic component 116 lie in sensing and emitting pulsed radiation in a controlled manner under the supervision of a micro controller.

The photodiode D1 senses radiation, and in particular light; coining from the opposing optical unit and generates an analog input signal which is connected to a receiving amplifier integrated into the control element 122. It is contemplated that also more than one photodiode can be provided.

Furthermore, the control element 122 controls an LED drive circuit so that the LED D2 emits a radiation beam to the opposing optical unit. The drive circuit is controlled by the control element 122 in a way that the emitted light intensity has a specified level. Optionally, more than one light-emitting diode D2 may be provided in the circuit according to FIG. 3. As already set forth above, the control element 122 is operable to communicate with the micro controller over two communication lines. The communication line from the micro controller to the control element 122 is a shared communication. All control elements in one module are connected in parallel with a digital buffer isolating each of the modules.

For instance, according to a typical implementation, an optical module 110 has nine optoelectronic components 116, forming a total of 18 beams, nine in each direction.

For regulating the driver transistor T1 of the diode D2 a sensing input is provided for sensing the emitted current of the light emitting diode D2.

Figure 4:
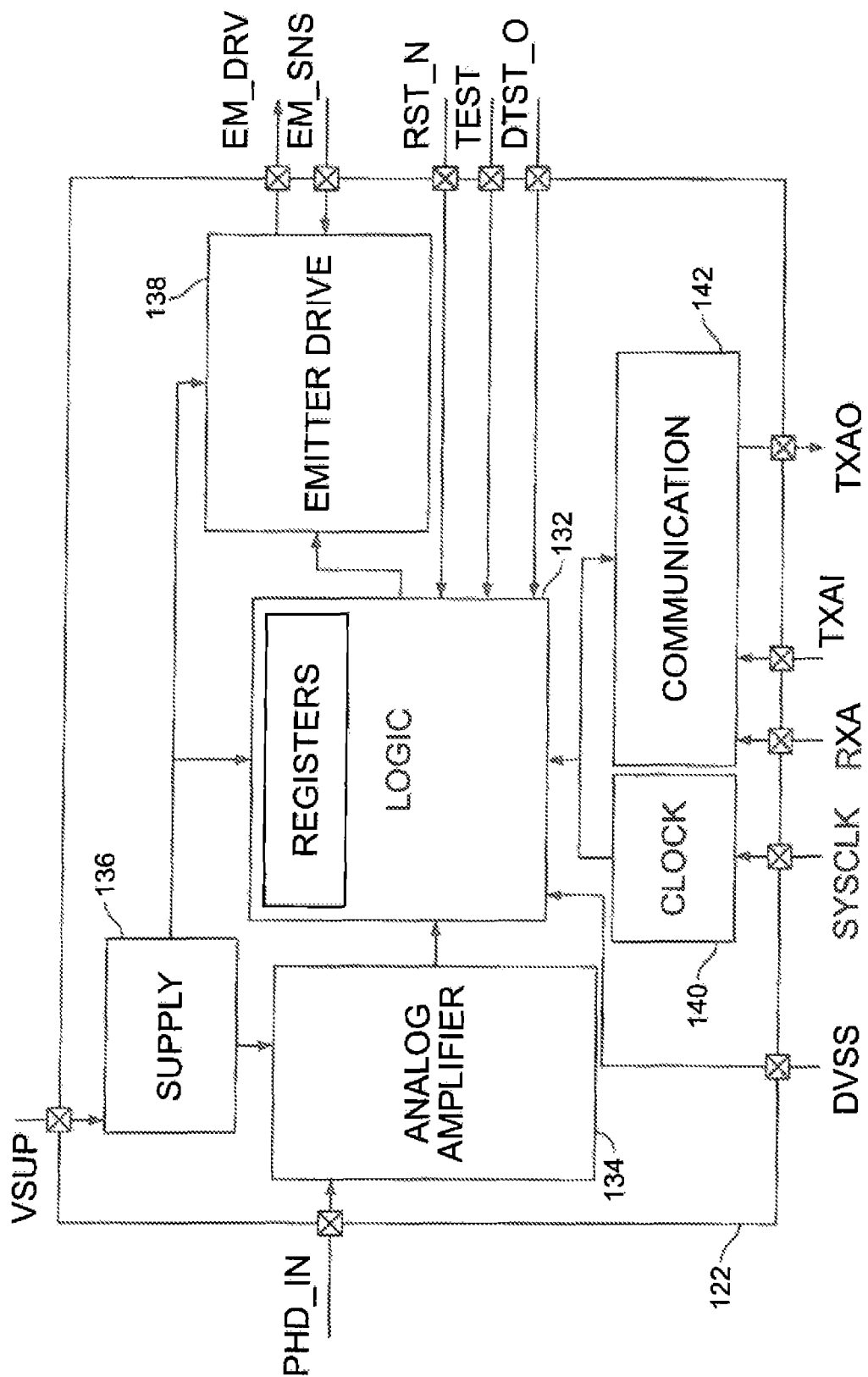
FIG. 4 shows a block diagram of the integrated circuit of FIG. 3.

FIG. 4 shows a schematic block diagram of the control element 122 according to FIG. 3. As already mentioned above, the control element 122 may be formed by an integrated circuit and may in particular be realized in the form of an application specific integrated circuit (ASIC) or a field programmable gate array design (FPGA). ASICs have the advantage of a full-custom capability, lower unit costs and a small form factor, whereas FPGAs have the advantage of a faster time to market and a simpler design cycle. In the following, the control element will often be called "ASIC". However, this does not restrict the control elements only to ASICs.

The control element 112 has analog and digital sections as well as interfacing cells. The analog amplifier 134 is operable to detect the signals measured by the photodiode. Furthermore, the logic section 132 contains the registers which are used for storing the address of the particular control element 122. The clock 140 is used to synchronize all control elements with the micro controller, run the internal logic, and sample the communication bus starter lines. The internal LED control 138 controls the LED current value by measuring the voltage across the external resistor RI shown in FIG. 3.

The power supply block 136 generates the voltage for supplying the internal circuitry, such as the digital logic supply and the analog supply. Auxiliary voltages for the bias of the photodiode and the analog ground reference may also be generated here.

The communication block 142 interfaces on one side with the external micro controller serial bus 124, as shown in FIG. 3, and on the other side with the internal logic 132.

Figure 5:
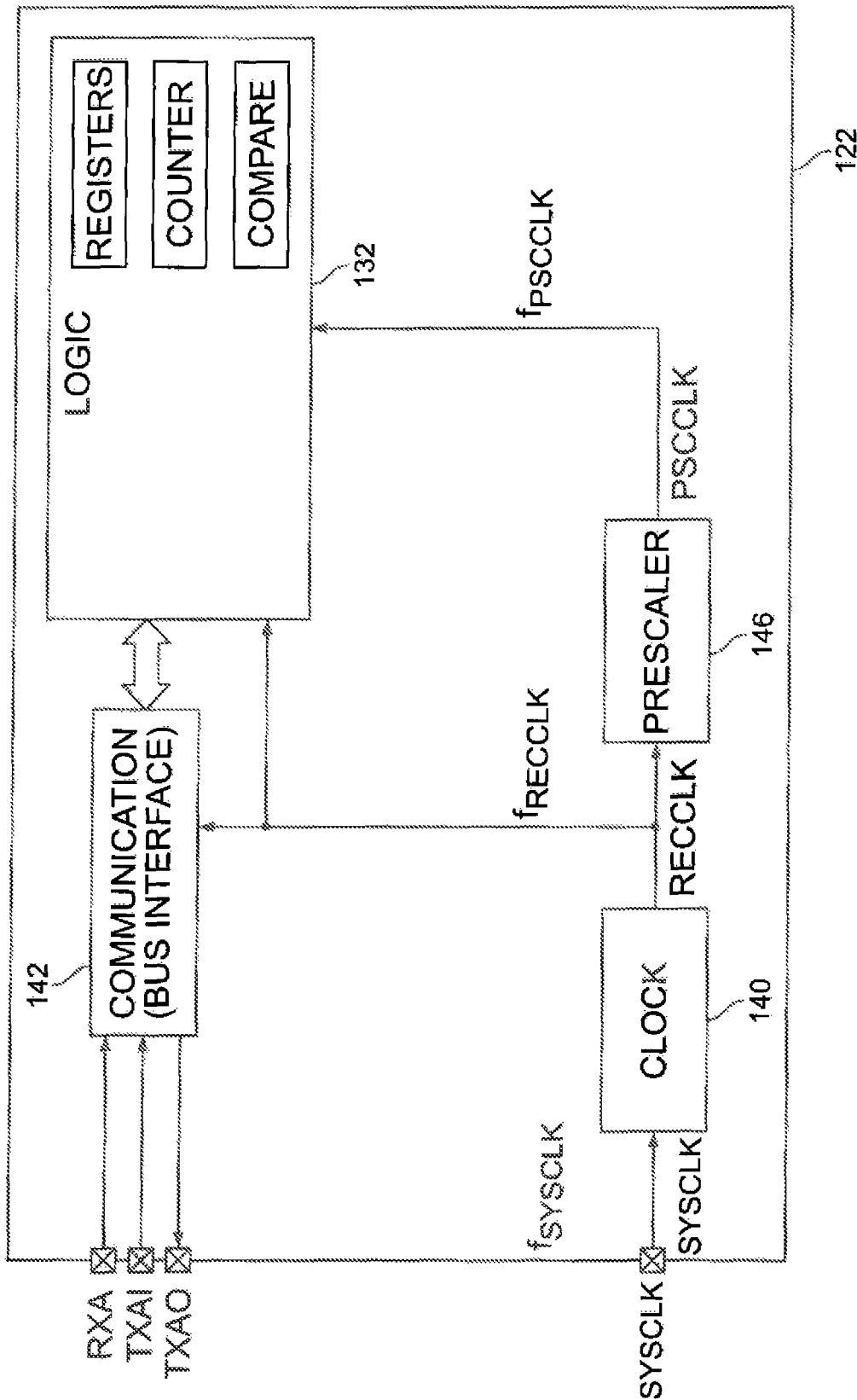
FIG. 5 shows a block diagram of the clock signal processing within the integrated circuit of FIG. 4.

FIG. 5 illustrates the clock related details of the control element 122 in the form of a block diagram. As illustrated, the control element 122 receives the external clock frequency fSYSCLK via its input SYSCLK. The clock input is used to measure and compare the timings of the sensed beam patterns, to generate correct beam patterns, as well as, to sequence the operation of the control element 122. The functional block, clock 140, recovers the clock input signal SYSCLK. According to a particular embodiment, the clock input is a current signal. In the clock block 140 both logic and analog elements are provided. In particular, a transimpedance amplifier is provided for converting the clock current signal to a voltage signal, which is then buffered as the recovered clock signal RECCLK. This minimizes the voltage change over time (dV/dt) on the clock input pin by using a current signal.

The clock block 140 outputs a recovered clock signal RECCLK with the same frequency as the input frequency: fRECCLK=fSYSCLK, but with a phase shift.

As indicated in FIG. 5, the communication interface 142 works with the frequency fRECCLK. Furthermore, the recovered clock signal is also an input for a prescaler 146. This prescaler 146 is operable to generate a divided internal clock frequency having half, a quarter, or an eighth part of the recovered clock frequency. However, the prescaler 146 can also be set to leave the frequency undivided. The prescaler output frequency fPSCCLK is dependent on the prescaler configuration. The pulse pattern recognition, the timing measurements and so on are computed proportional to the divided clock frequency fPSCCLK, which according to an advantageous embodiment is half of the recovered clock frequency fRECCLK. For a continuous system clock of 0.8 to 4.8 MHz, the prescaler frequency would be between 0.4 and 2.4 MHz. However, it is clear that other values can of course also be implemented or configured.

Figure 6:
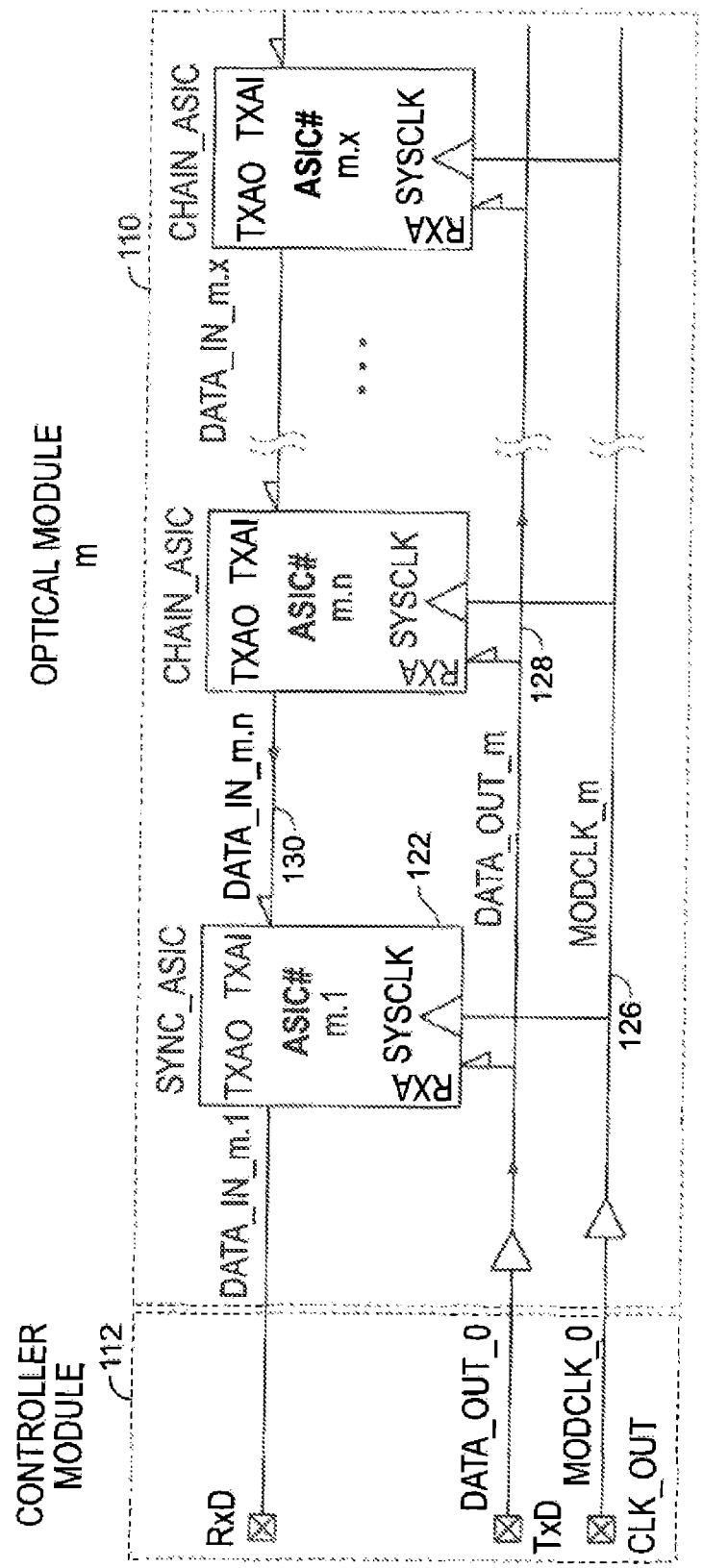
FIG. 6 shows a schematic representation of an optical unit according to one embodiment of the present invention.

With respect to FIG. 6, the communication between a particular optical module 110 and the controller module 112 is illustrated. In this figure as well as in the following figure the particular embodiment of using an ASIC as the control element 122 is considered. However, as outlined above, any other suitable technique for realizing a control element 122 can be employed here as well.

In order to allow the ASICs to operate in such a multiple ASIC system, each ASIC is assigned a unique identifying address which is stored in a bank of registers, and the ASICs respond to system commands via a shared serial bus. In response to the commands, the ASIC replies via a shared single-bit serial bus with an arbitration mechanism.

Furthermore, the plurality of ASICs is interconnected by means of at least one serial daisy chain line, which, in the embodiment shown in FIGS. 3 and 5, is provided by the data-in bus communication line 130.

Figure 7:
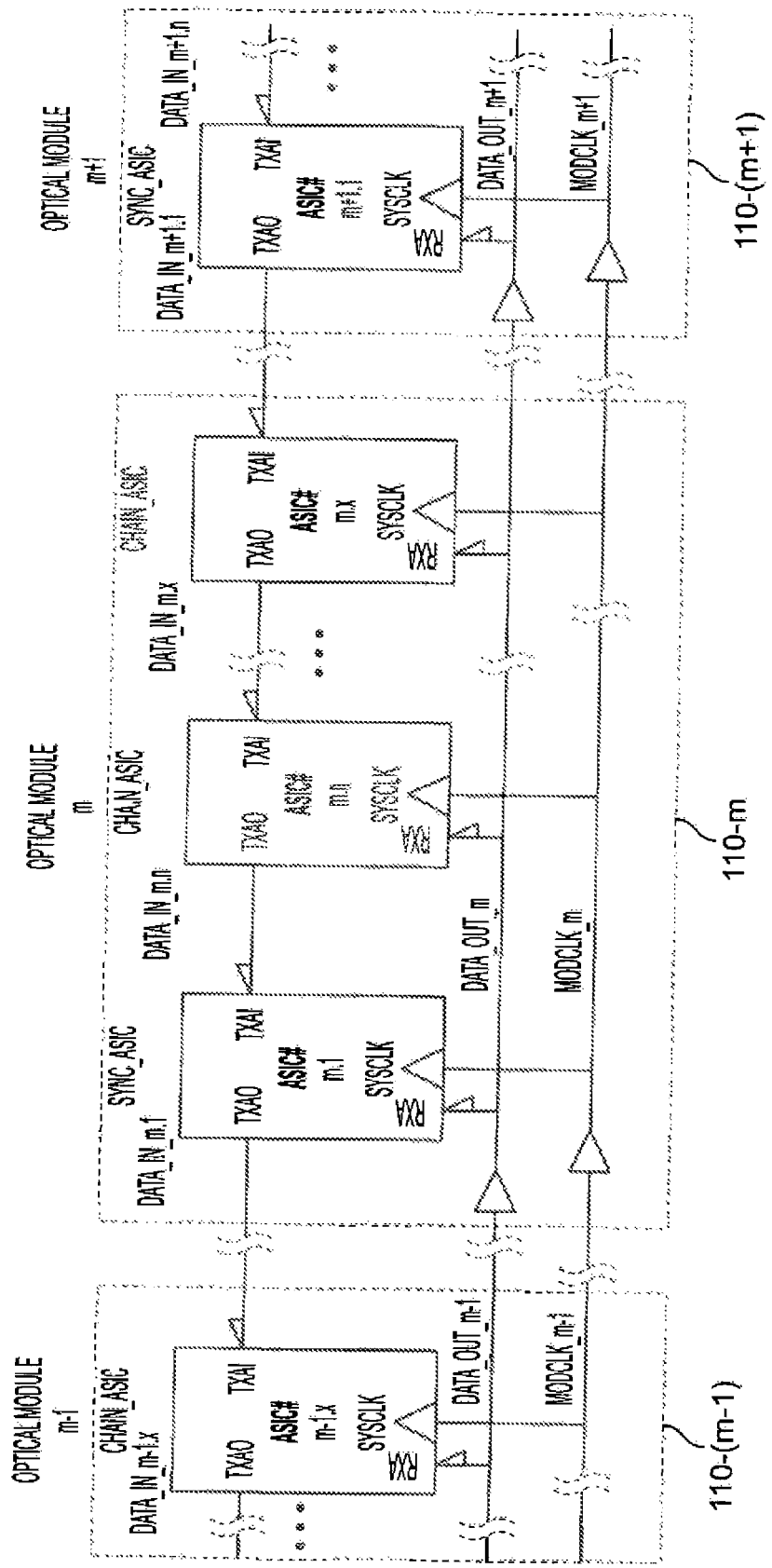
FIG. 7 shows a schematic representation of an optical unit according to another embodiment of the present invention.

FIG. 7 shows the case where a plurality of optical modules 110 is provided instead of the single optical module shown in FIG. 6. The principles of the present invention may of course be employed for the embodiment shown in FIG. 7 in the same way as for a case where only one module 110 is present.

An important aspect of the present invention can be seen in the fact that by using a transceiver element according to the present invention, a data transmission through the optical path from a transceiver element of one stick to another transceiver element in the opposing stick is feasible. By providing the receiving and transmitting function in each transceiver element, the data transmission can be effected in both directions.

Particular encoding schemes can be employed to perform this communication between two optical units. Examples for such an optical encoding will now be explained in more detail with reference to FIGS. 8 to 11.

Figure 8:
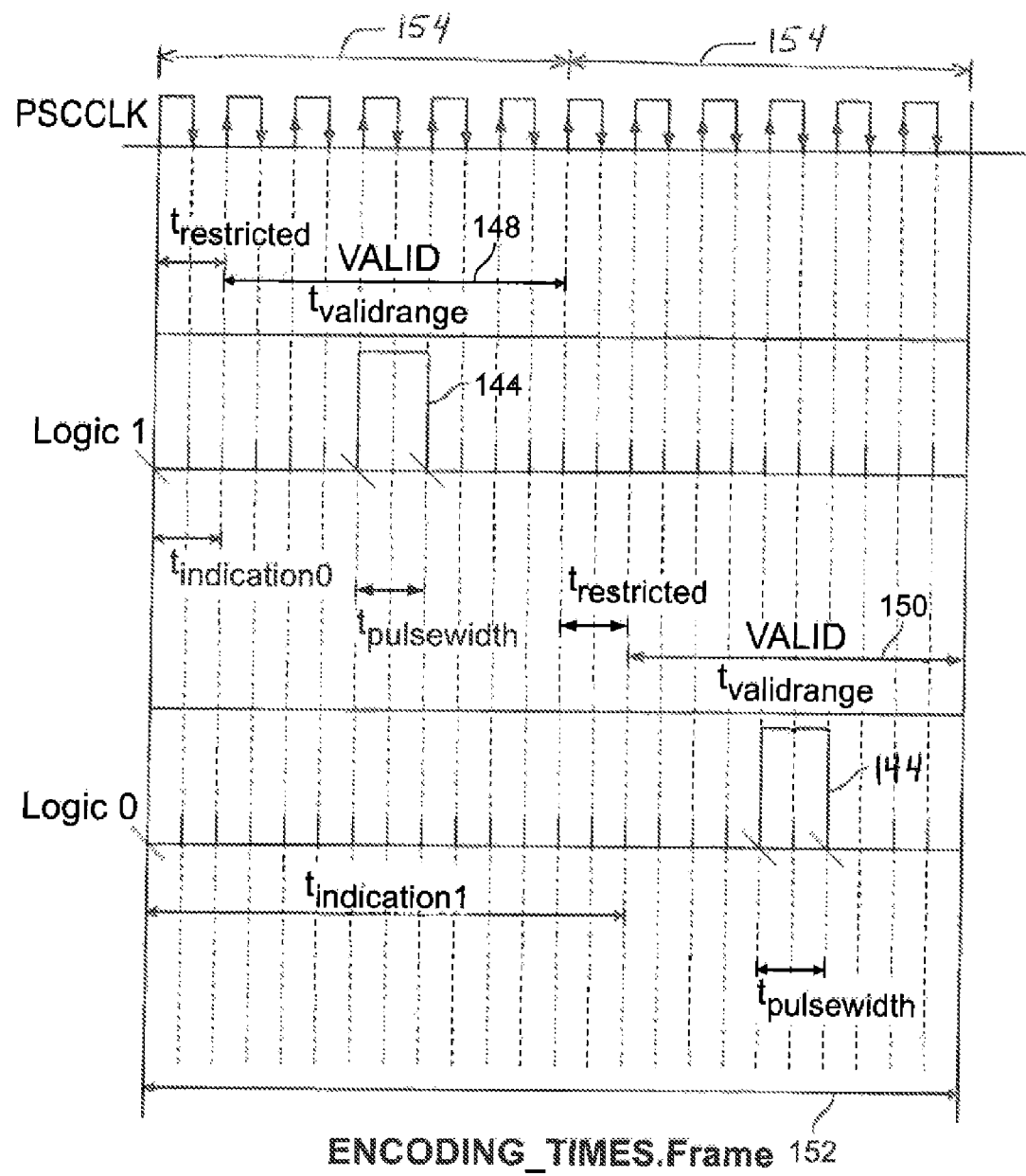
FIG. 8 shows a first encoding scheme for transmitting information via light pulses in a predefined time frame.

FIG. 8 shows a first possibility of using the position of one light pulse within a particular time frame for indicating a logic value, in particular, a logic one or a logic zero.

As show in FIG. 8, the scheme involves a light pulse 144 per symbol and the position in a predefined time window defines the symbol and in particular whether it should signify a logic one or a logic zero. In particular, if the light pulse 144 is emitted and sensed within a first part 148 of the time frame, it is recognized as a logic one, whereas its presence within a second part 150 of the time frame is interpreted as a logic zero. The complete encoding time frame may, for instance, have a duration of 12 prescaler clock cycles. In this case the time for the first and second parts 148, 150 of the encoding time frame 152 may be chosen to have a duration of five prescaler clock cycles. A restricted time may be provided for ensuring a clear separation of the first and second part 148, 150. The pulse width of each optical pulse 144 may for instance amount to one prescaler clock cycle. However, it is clear for a person skilled in the art that of course also completely different timing ranges can be used.

Figure 9:
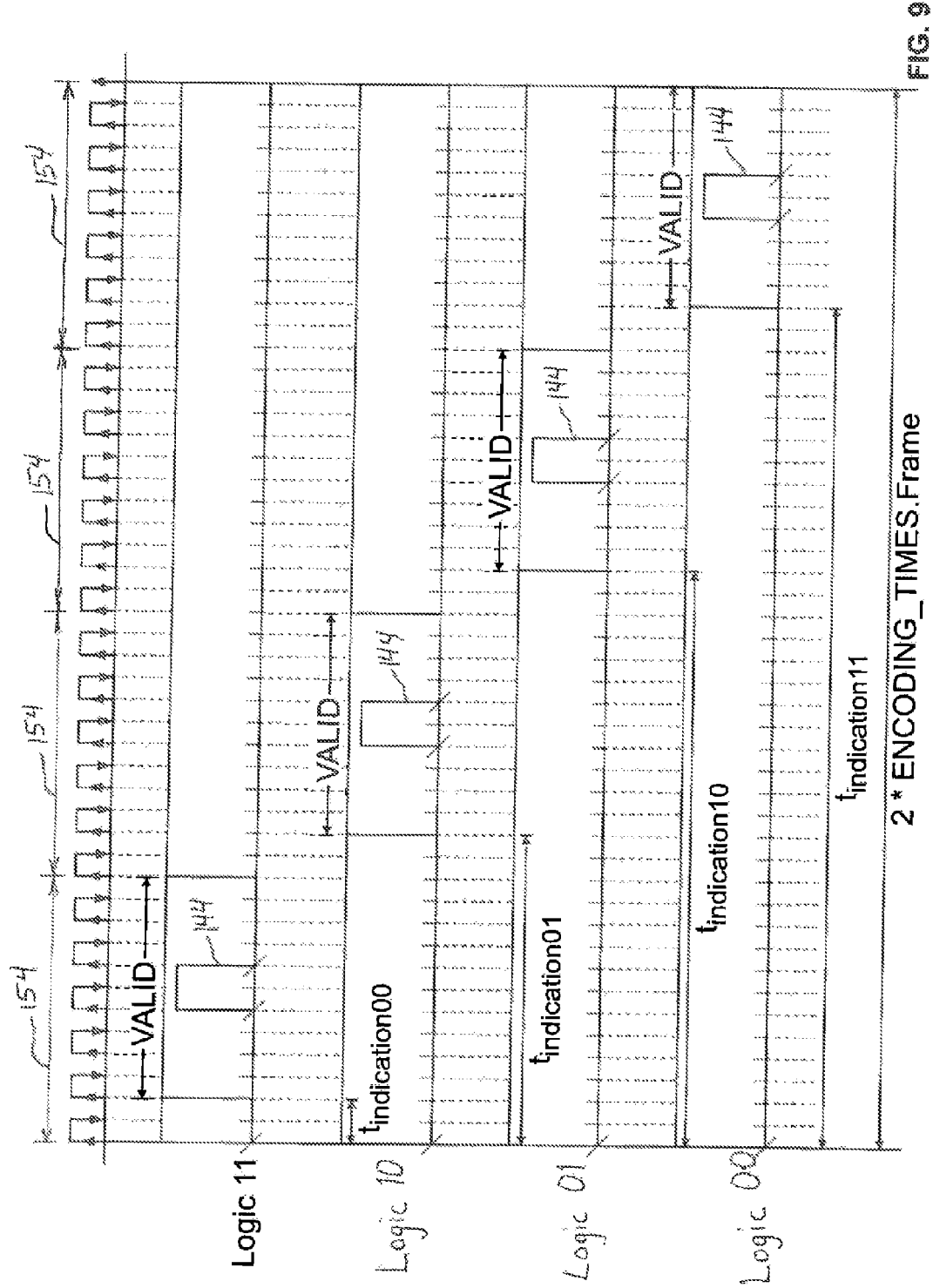
FIG. 9 shows a second encoding scheme for transmitting information via light pulses in a predefined time frame.
Figure 10:
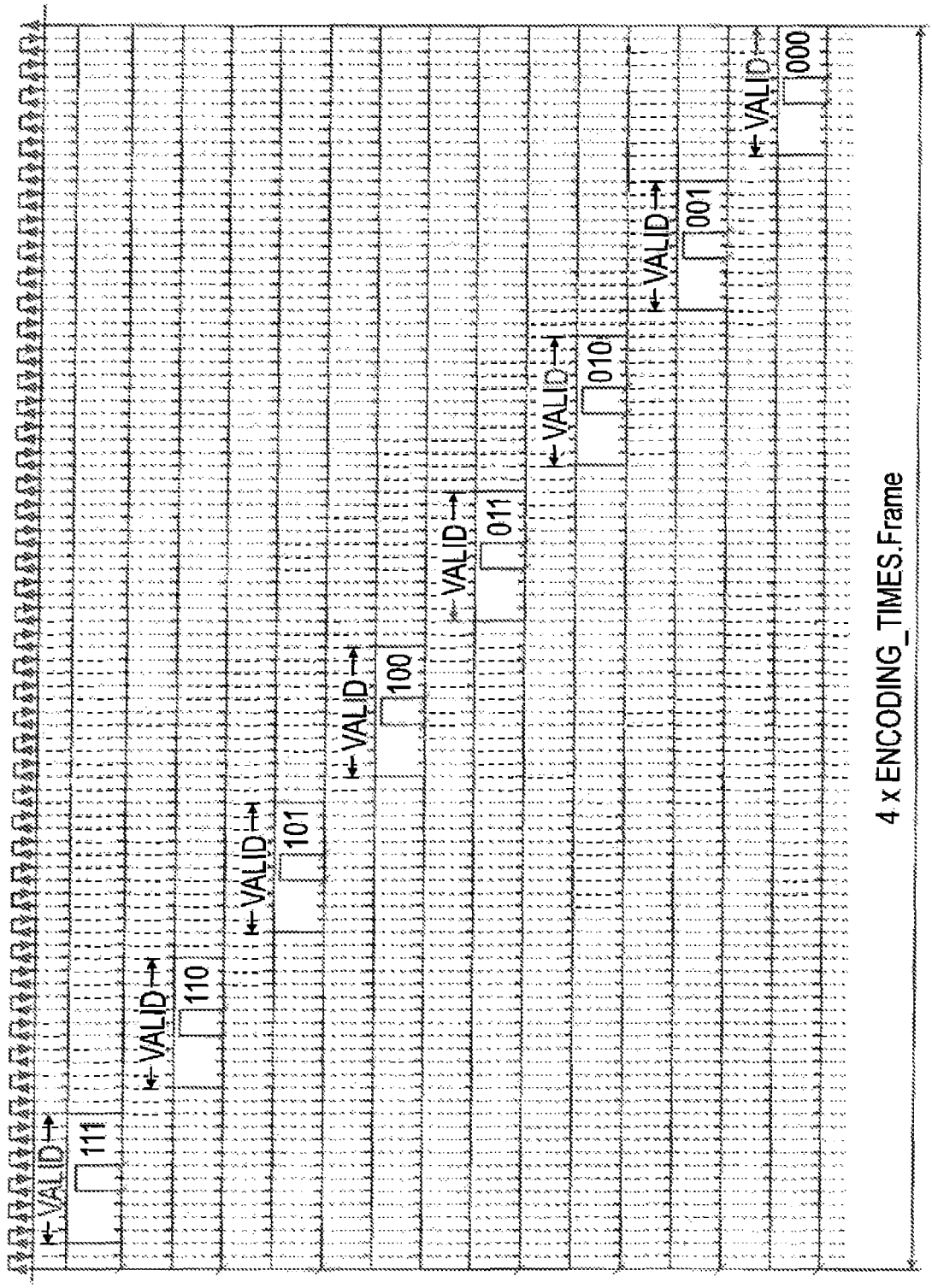
FIG. 10 shows a third encoding scheme for transmitting information via light pulses in a predefined time frame.
Figure 11:
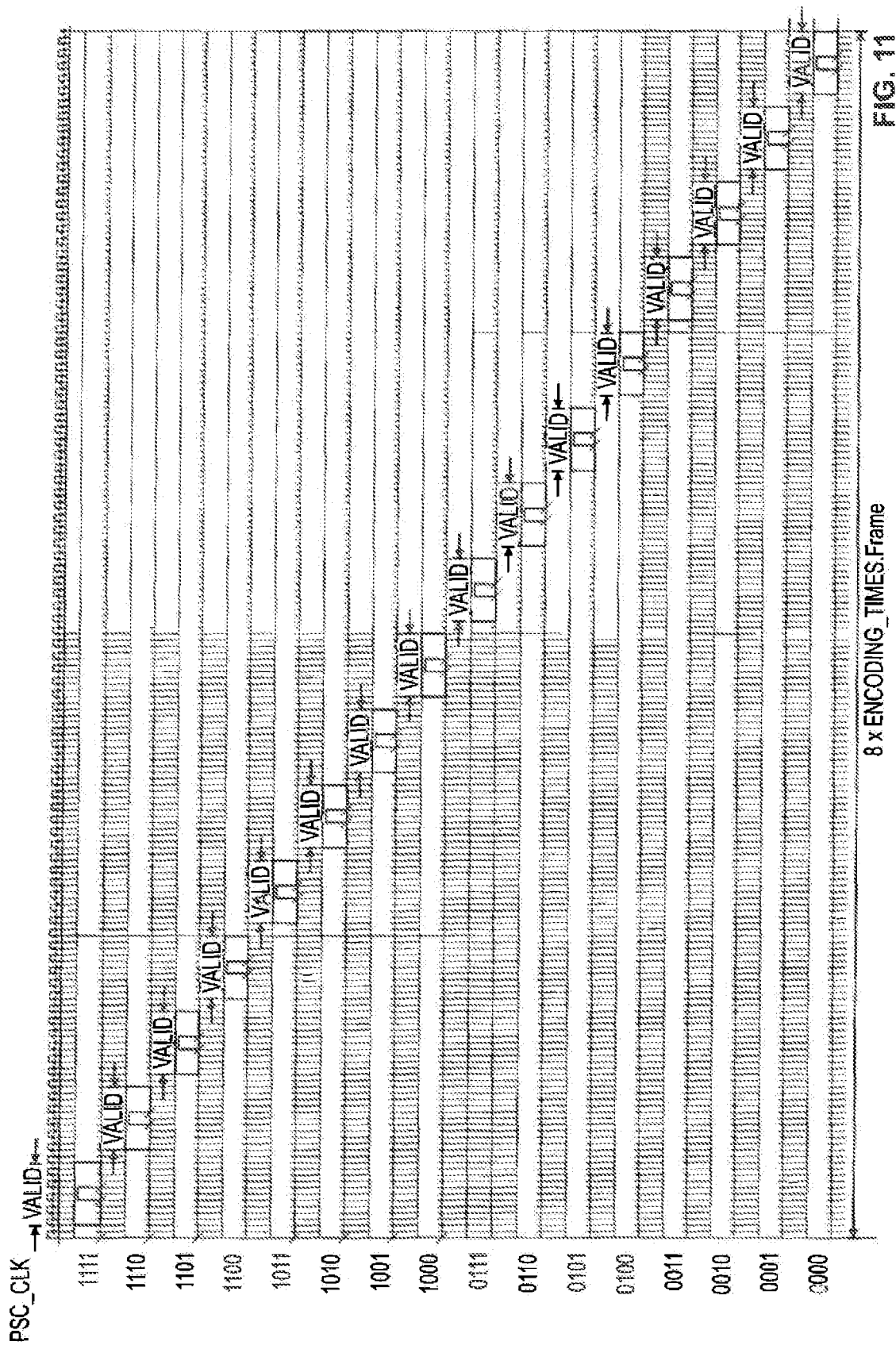
FIG. 11 shows a fourth encoding scheme for transmitting information via light pulses in a predefined time frame.

By defining multiple subframes 154 within one encoding time frame 152, a single light pulse 144 can be used to encode more than one bit. FIG. 9 shows, for instance, the encoding of two-bit data with one light pulse. For this encoding scheme a total of four subframes are defined within the encoding time frame 152. As shown in FIG. 9, the occurrence of a light pulse within one of the subframes 154 signifies one of the two bit logic words 11, 10, 01 or 00. In an analogous way also higher bit encoding schemes can be defined, as shown in FIG. 10 for a three-bit encoding scheme and FIG. 11 for a four-bit encoding scheme.

Figure 12:
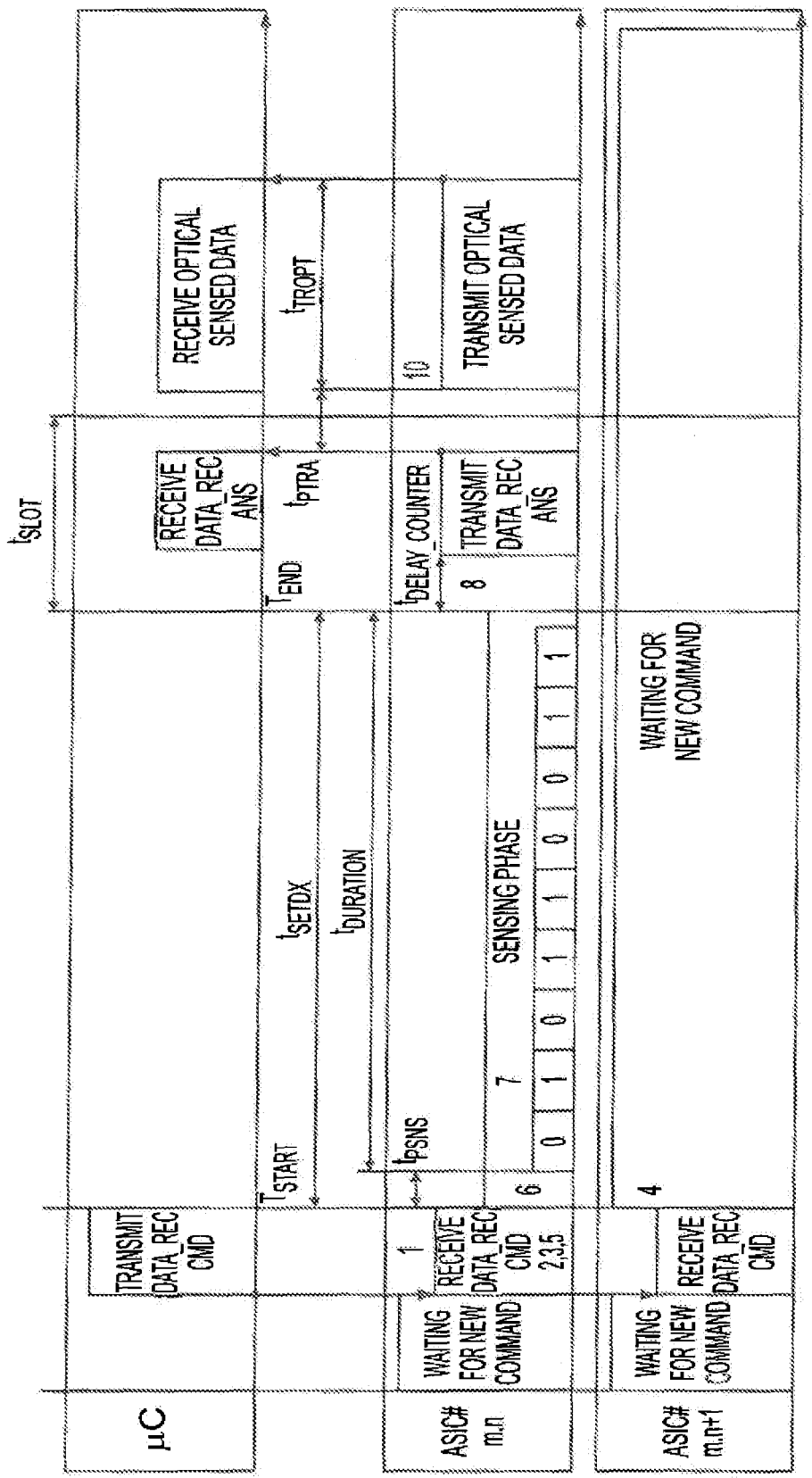
FIG. 12 shows a timing diagram for a data receive command.

FIG. 12 is a timing diagram that illustrates the signaling between a micro controller, μC, in on optical unit and two exemplary control elements called ASIC# m.n and ASIC# m.n+1. As depicted in FIG. 12, the micro controller, μC, which functions as the bus master, transmits a data receive command to all the connected transceiver elements. All the connected transceiver elements check whether the address is matching, which means that the command is directed towards the particular transceiver element. If this is not the case (as shown for ASIC# m.n+1), the ASIC starts waiting for a new command from the bus again (step 4 of FIG. 12).

On the other hand, if the address matches, the particular ASIC decodes the command and receives information about the length of the expected optical data. As indicated by reference numeral 6, the ASIC enables the sensing time window and tries to detect light pulses from the opposing optical unit and to receive a data stream via this optical channel. The data are received and may for instance be stored in a buffer. This is indicated as the sensing phase (step 7).

After the ASIC has received the number of bytes it has expected, an answer is sent back to the micro controller. A predefined time after having thus announced that data have been received, the optically sensed data are transmitted from the buffer storage of the particular transceiver element to the micro controller which can be connected to an interface that functions as the connection to an external component or otherwise use the optically transmitted data appropriately within this particular optical unit.

According to the present invention, each transceiver element has enough intelligence to function as a receiving component for performing an optical communication with an opposing optical unit.

On the other hand, each of the transceiver elements is also operable to send data via the optical path by means of its one or more light emitting diodes to an opposing optical unit. The respective data send command may be a direct or a broadcast command to the transceiver elements connected to each other by means of the communication bus. The command is followed by a number of data bytes, which will be stored for instance in a volatile memory in the control element of the particular transceiver element. After all data have been received, the control element will drive one or more LEDs to optically transmit the information, for instance using the coding scheme explained before. For a person skilled in the art it is however clear that also any other suitable coding schemes can be used for the optical transmission of the data from one transceiver element to an opposing optical unit.

Figure 13:
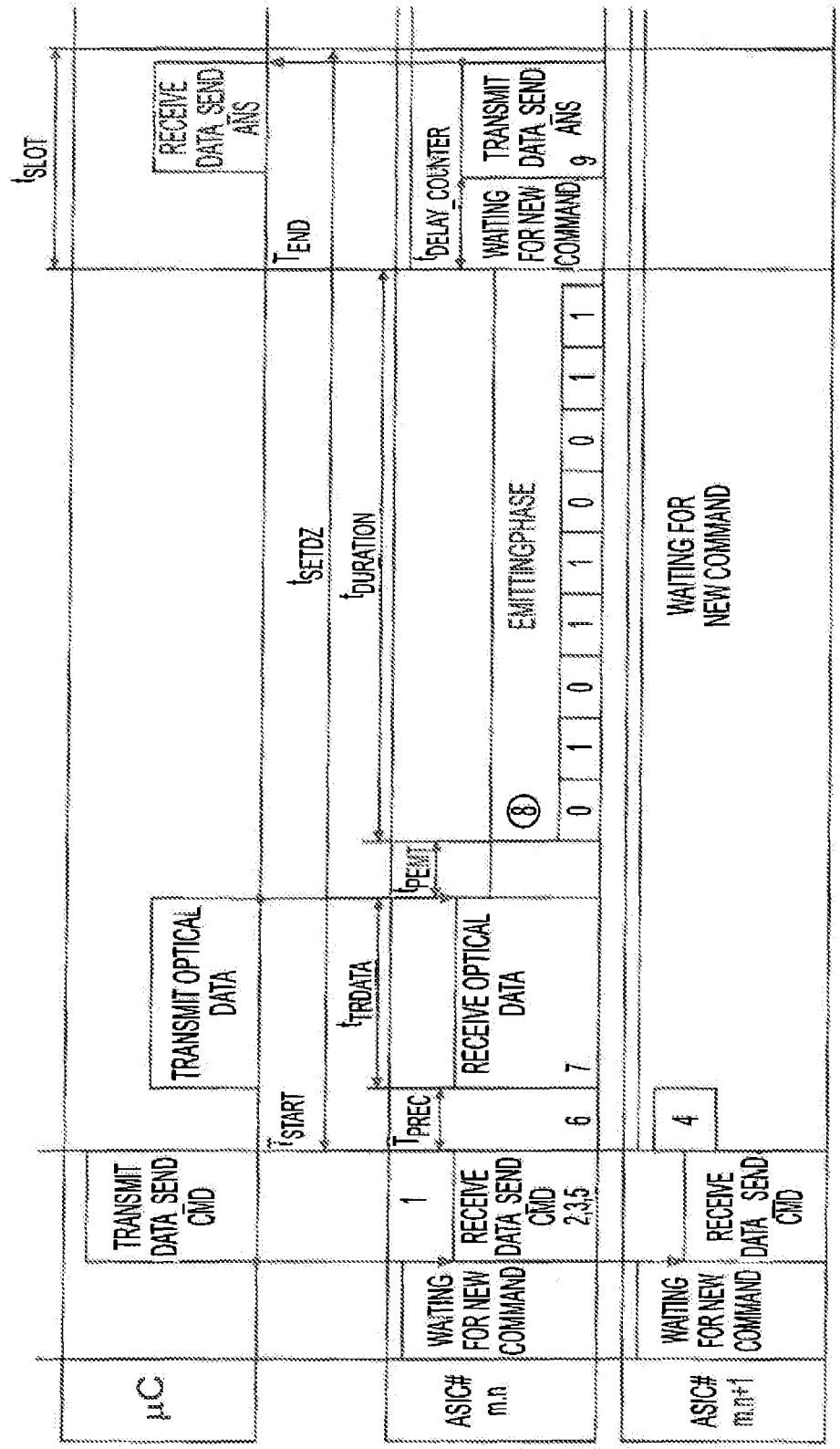
FIG. 13 shows a timing diagram for a data send command.
Figure 14:
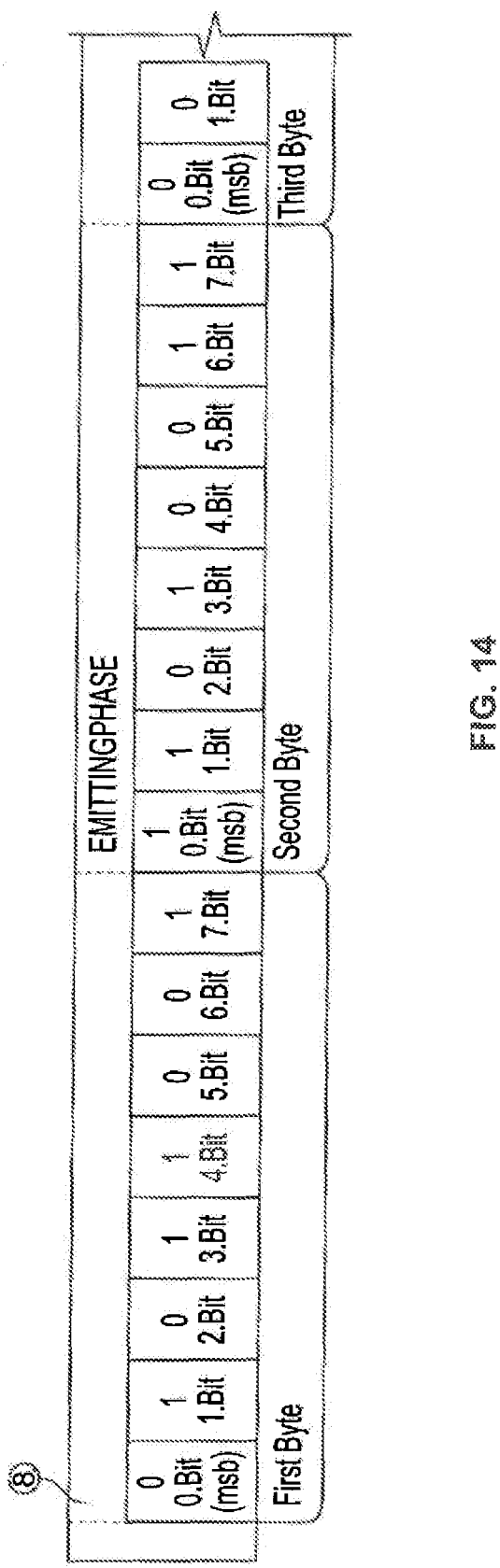
FIG. 14 shows a detail of an emitting phase for the data sent command shown in FIG. 13.

FIGS. 13 and 14 illustrate the sending procedure for the optical communication. Again, a micro controller, μC, represents the bus master of a communication bus containing at least one transceiver element. As an exemplary illustration, FIG. 13 depicts two ASICs, namely ASIC# m.n and ASIC# m.n+1. According to an advantageous embodiment, the data send command is also transmitted as a broadcast command, so that all the connected transceiver modules receive and interpret the parity bits and address data and check for a match (steps 1, 2 and 3). If the address does not match (step 4), the particular ASIC, here ASIC# m.n+1, continues to wait for a new command on the bus.

In contrast thereto, if the address matches, meaning that the particular command is intended to be executed by ASIC# m.n, this ASIC decodes the data send command and checks a data field for the number of bytes which have to be sent. This is depicted as step 5. The micro controller now sends the data bytes to be emitted and the ASIC stores these data bytes in a buffer storage (steps 6 and 7).

After the ASIC has received all data bytes according to the predefined number of bytes, the transceiver module starts emitting the information on the optical path by driving the LEDs accordingly. This is the emitting phase referred to in step 8. Next, after the ASIC has finished this operation, it sends back an answer to the micro controller to verify that the command has been executed successfully.

FIG. 14 shows a detail of the emitting phase of FIG. 13. According to this example, the most significant bytes of the first byte will be put first on the bus. However, of course also different data alignment schemes can be chosen.

FIG. 13 furthermore indicates several advantageous timing parameters which are defined for the optical transmission. In particular, TSTART gives the time instance when the command is completely received, whereas TEND indicates the time instance when the emitting phase is concluded. A certain preparation time TPREC is defined between the moment TSTART and the beginning of the transmission of the data on the bus. The parameter tSETDZ indicates the time between when the command was completely received and when all the data are completely emitted to the opposing optical unit and also back to the micro controller. The time tTRDATA indicates the time which it takes to transmit the data from the micro controller to the ASIC which will be emitted to the opposing optical unit. Finally, also for transmitting the data optically, a preparation time is planned which is indicated by tPEMT.

According to the present invention, each transceiver module has a control element 122 that unites a driving unit as well as receiver circuitry coupled to one or more light emitting elements and light receiving elements, respectively. These two aspects of the control element 122 are illustrated in FIGS. 15 and 16.

Figure 15:
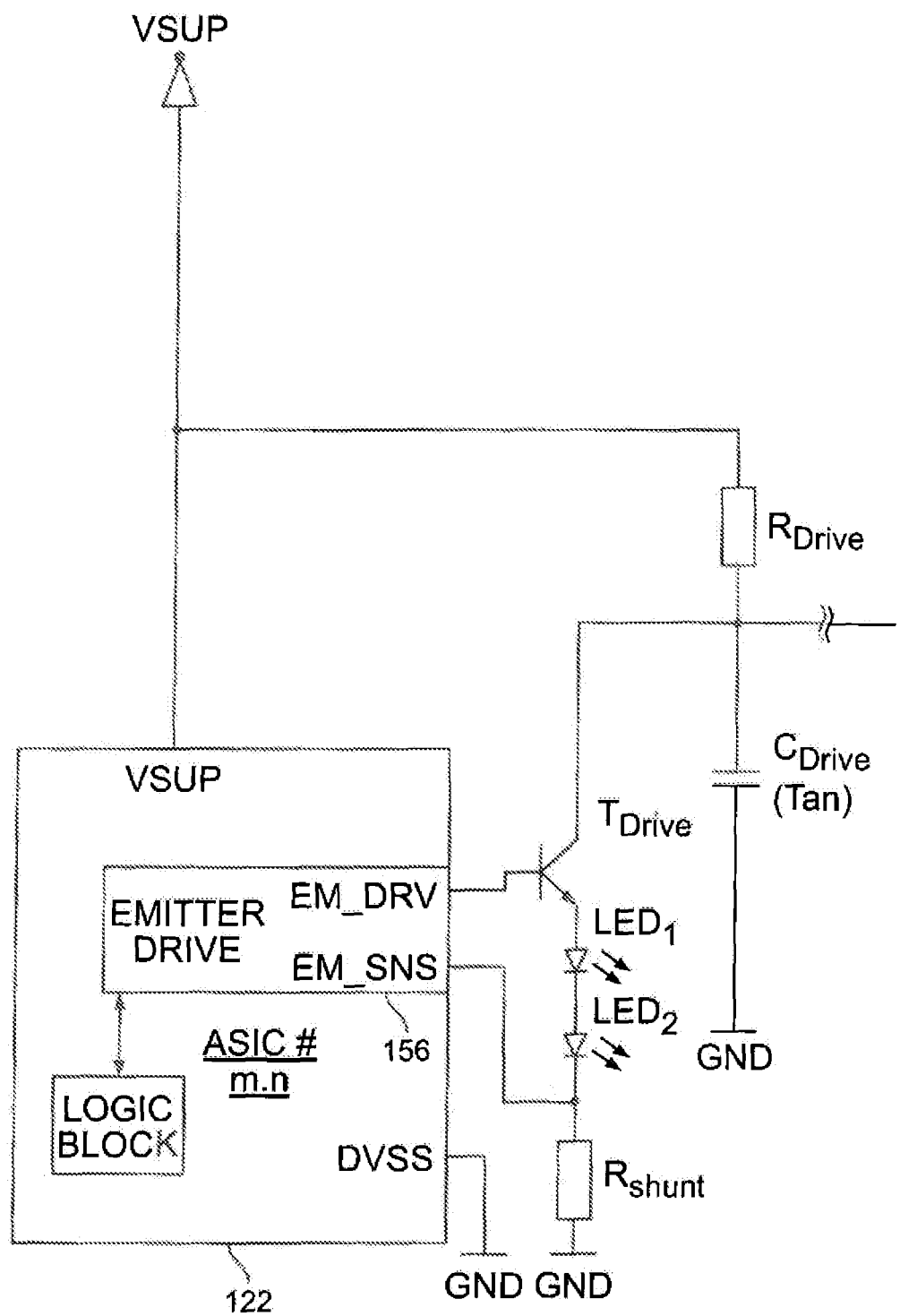
FIG. 15 shows a block diagram of a driver unit for driving two photodiodes.
Figure 16:
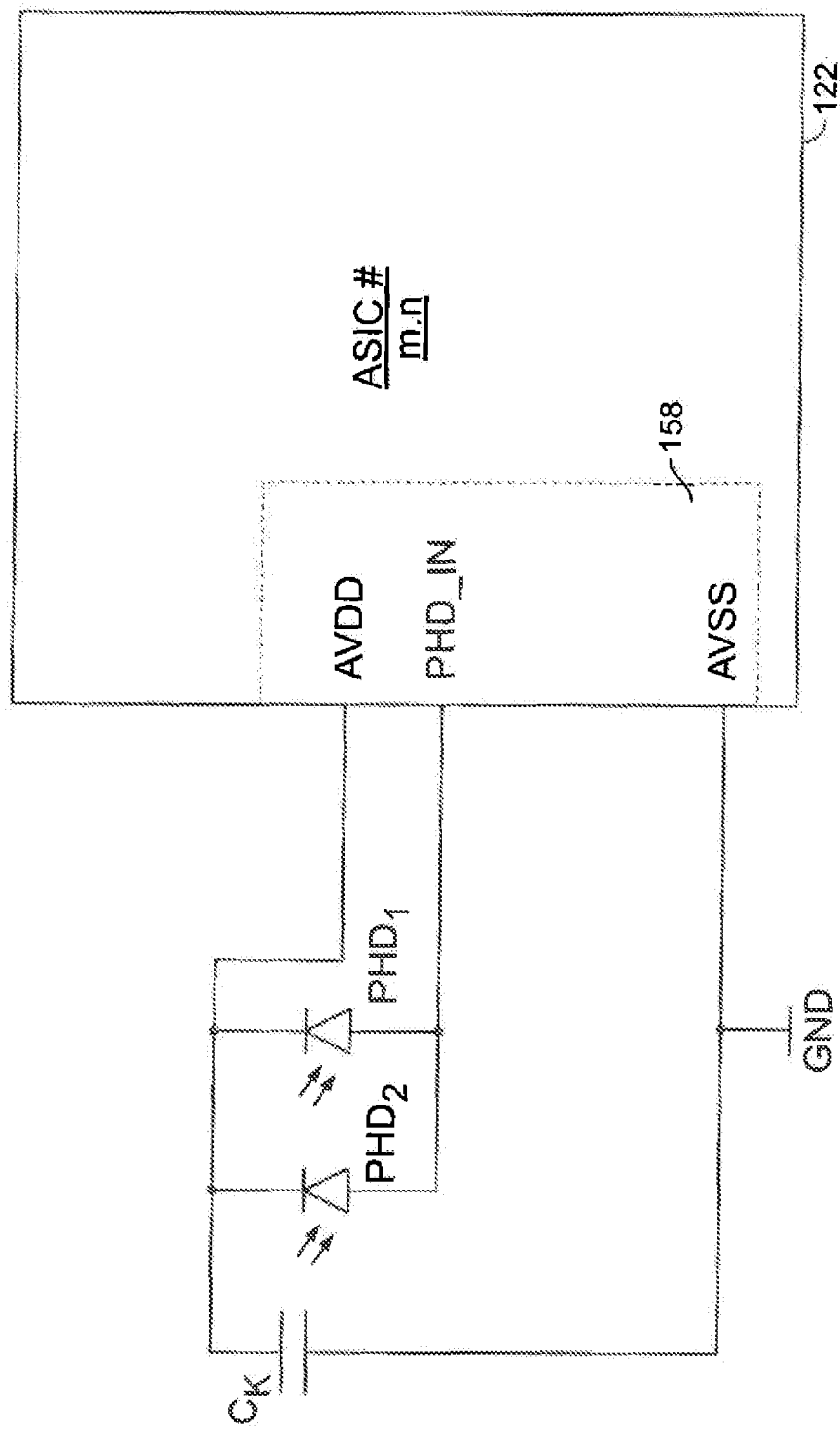
FIG. 16 shows a block diagram of a receiver unit.

In particular, FIG. 15 shows an embodiment where two light emitting diodes LED1 and LED2 are driven by the ASIC 121 in particular, the control element 122 comprises an emitter drive circuit 156 which is connected to an external driving transistor TDrive and the two LEDs LED1, LED2. A shunt resistor Rshunt and a drive resistor RDrive are furthermore provided as external components. However, it is clear for a person skilled in the art that these external components may also be provided internally within the control element 122.

As shown in FIG. 15, one or two LEDs are connected to an LED drive circuit for emitting a light beam to an opposing other optical unit or a reflective surface, LED2 in this case is optional and a transceiver element may also be used with only LED1. For a person skilled in the art it is of course clear that also more than two LEDs can be driven by the control unit 122. The drive circuit 156 is controlled by the control element and the emitted light intensity can be driven to different specified levels. The control element 122 uses the EM_SNS pin as a feedback from the LED, so that the current is adjusted precisely. The emitter drive block 156 controls the timing and intensity of the LED emission. The emitter drive block 156 has both logic and analog elements. The inputs to this block are the logic signals defining the time, duration, and intensity of the LED emission.

LED current pulses are sourced from the emitter of an external NPN current amplifier. The LED current is fed back to the ASIC 122 as a voltage across the external resistor Rshunt to digital ground via the EM_SNS pin. If the emitter drive circuit 156 is unable to drive the LED network such that the EM_SNS feedback is within the specification, the block may be operable to send an error signal to the digital communication block which is connected to the bus.

On the other hand, as shown in FIG. 16, each control element is connected to one or more photodiodes for detecting radiation. As already mentioned, according to the present invention, the ASIC 122 comprises both aspects shown in FIGS. 15 and 16, respectively, at the same time.

In particular, a receiver circuit 158 is provided which is able to evaluate one or more photodiodes PHD1, PHD2, being connected in parallel. In particular, the receiver circuit 158 may comprise a high gain transconductance amplifier with multiple output comparators to detect the signal presence and to measure a light intensity. The block 158 has both logic and analog elements. In particular, the comparator inputs can be gated during light beam sensing windows, as defined by the complete system.

Figure 17:
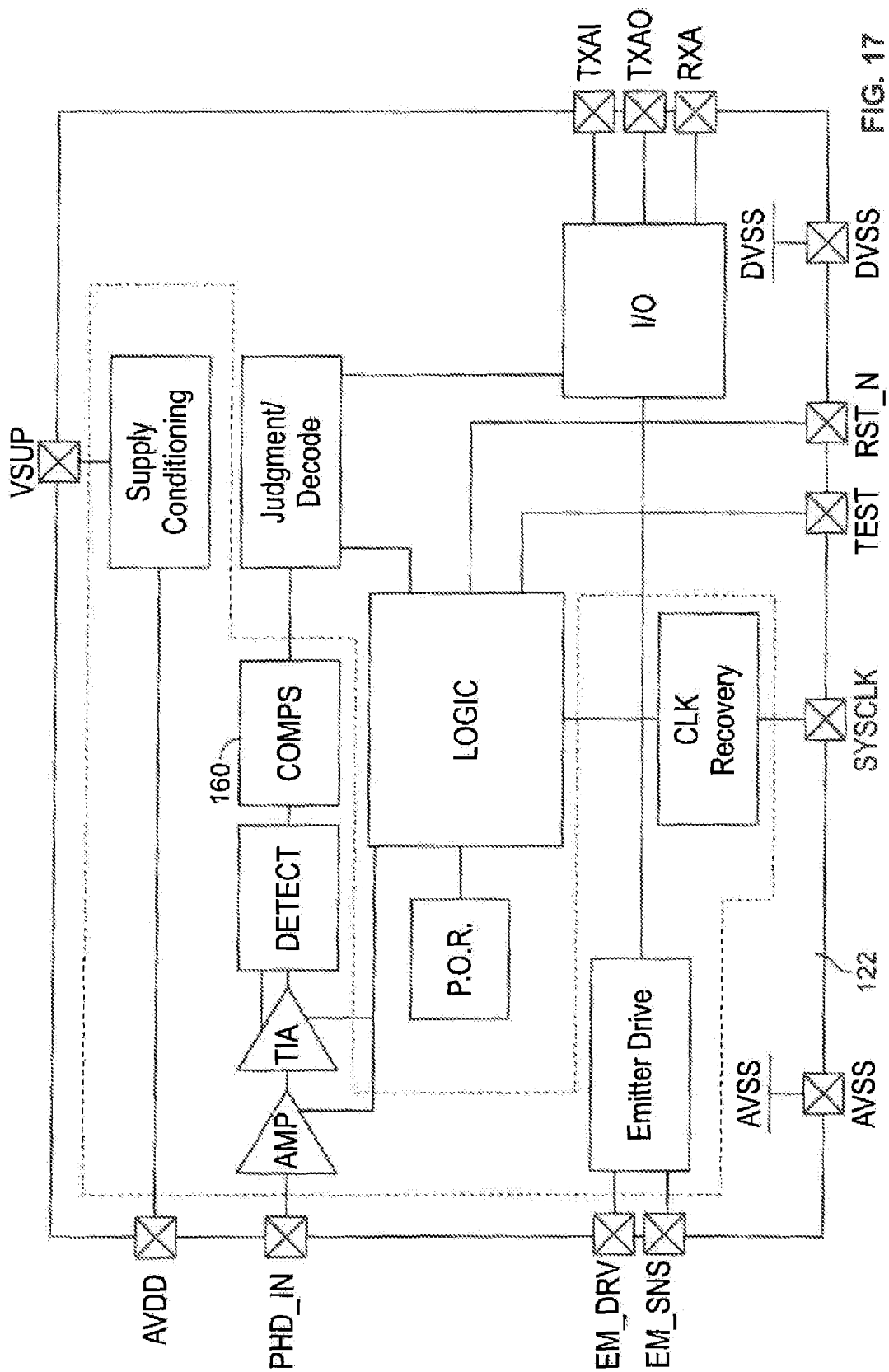
FIG. 17 shows a block diagram of a control unit focused on the photodiode input circuitry.
Figure 18:
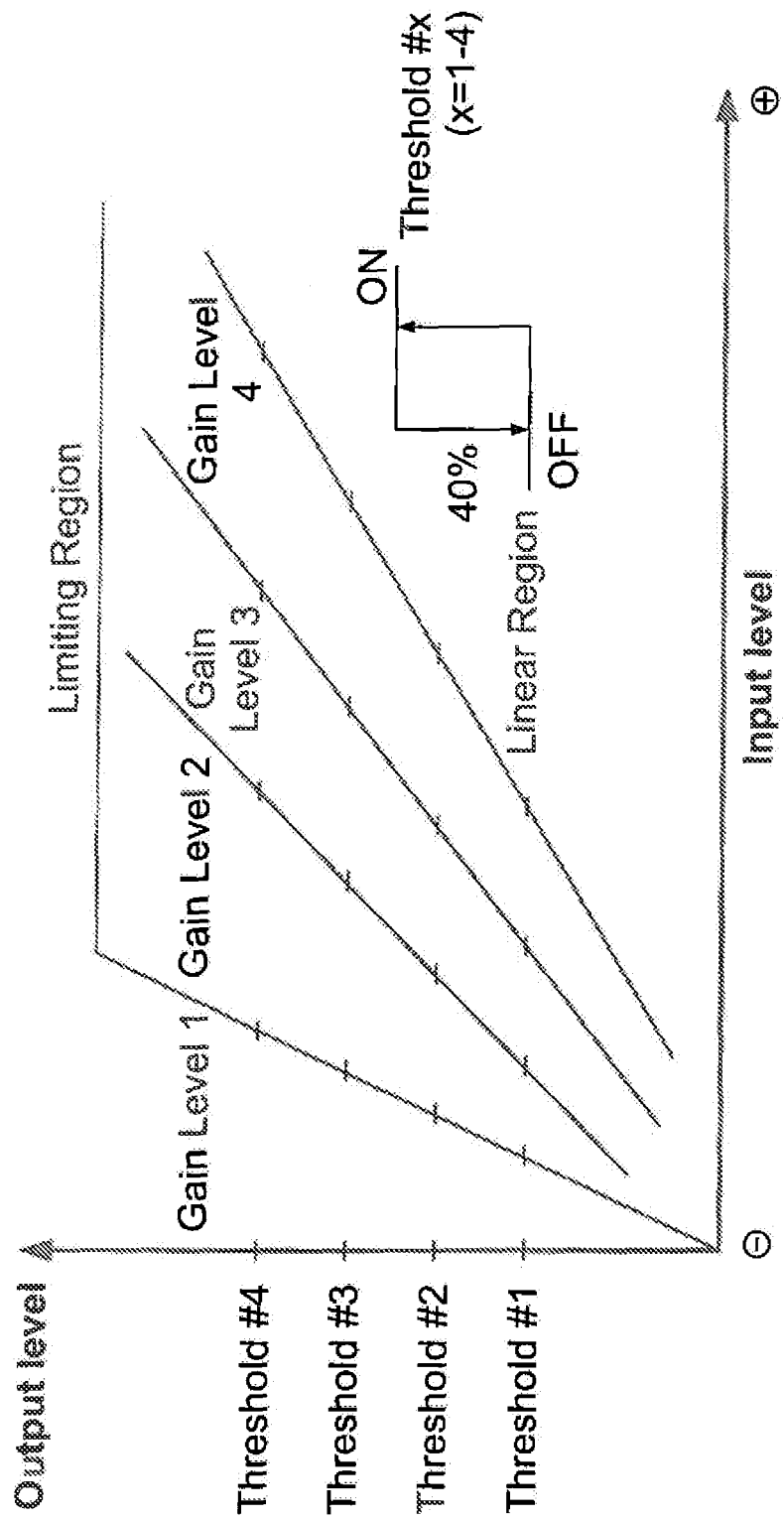
FIG. 18 shows the optical receiver gain characteristics and comparator thresholds.

FIG. 17 shows a more detailed internal block diagram of the control element 122 with a focus on the photodiode input PHD_IN. As shown in FIG. 17, the sensed signal of the photodiodes PHD1, PHD2 is input into, a comparator unit 160. The comparator characteristics can be selected between two sets of levels corresponding to four different gain curves which are depicted in FIG. 18. For each gain curve there are four comparators, each of which has its own threshold level and hysteresis function. The hysteresis window is 40% wide, as this is also indicated in FIG. 18.

Figure 19:
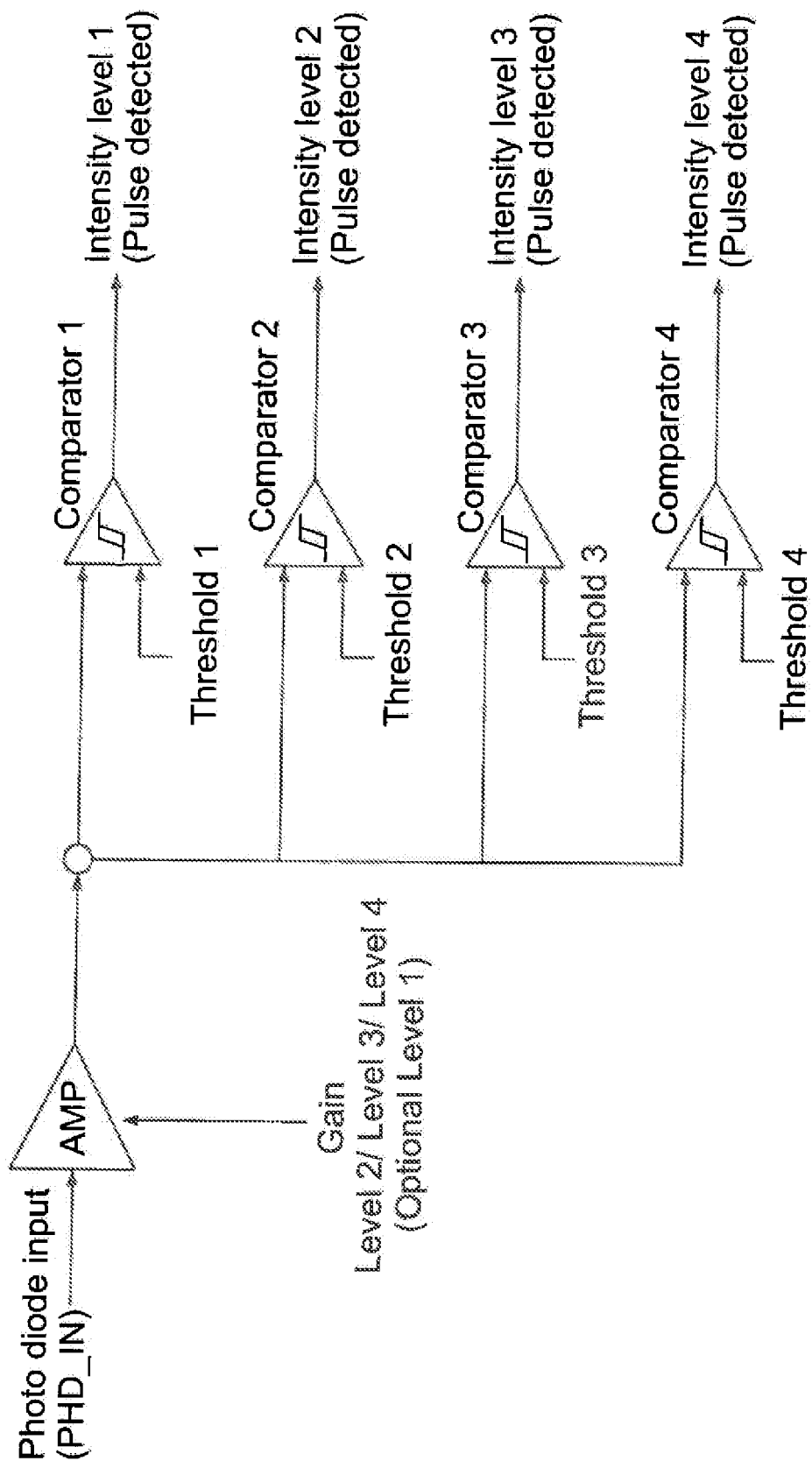
FIG. 19 depicts evaluation of the intensity levels using level comparators.

As shown in FIG. 19, the intensity level of the photodiode input can be measured for instance by four comparators and the result of the evaluation of the light intensity gives the information of what intensity level is present. If a particular chosen threshold is not reached, warning means can be provided to warn an operator that the intensity of the sensed light pulses is below a predetermined value.

Figure 20A:
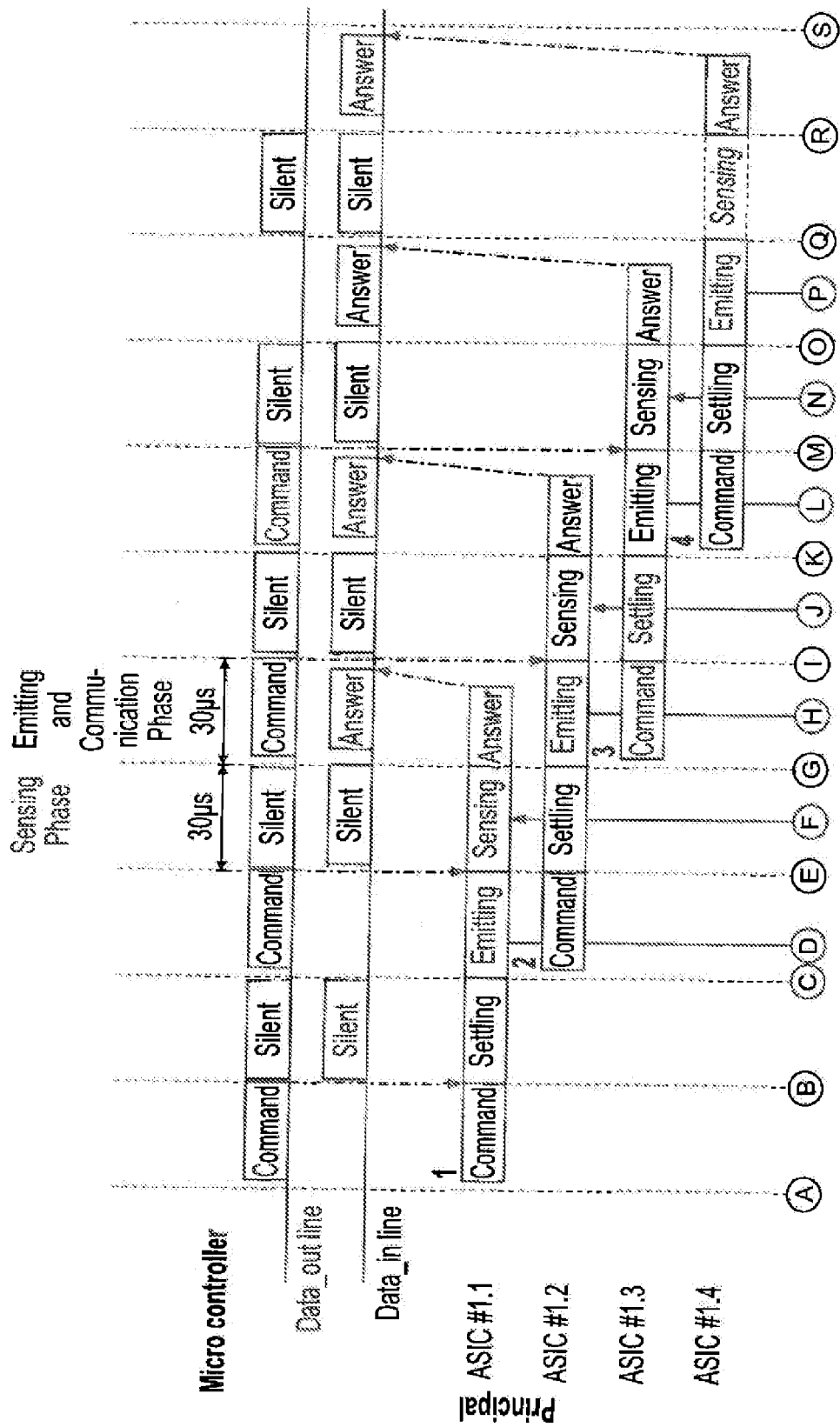
FIG. 20 shows a timing diagram for illustrating the communication, between two optical units according to the present invention.
Figure 20:
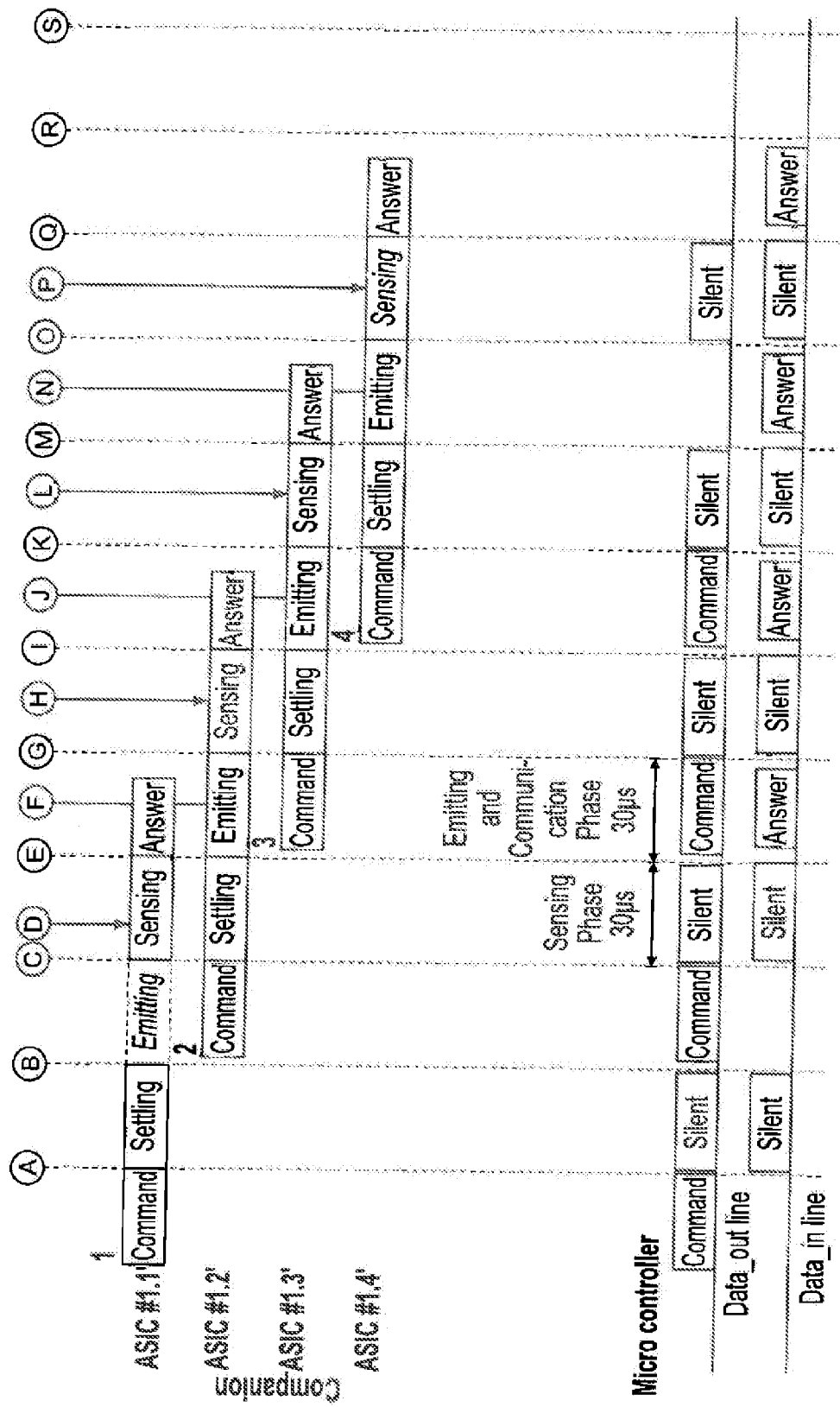

FIG. 20 illustrates a further aspect of the optical and electrical communication in a photoelectric barrier according to the present invention. The timing diagram of FIG. 20 illustrates in particular the communication between a first and a second optical unit, one of which is defined as the principal (or master) optical unit and the other one as a companion (or slave) optical unit. Four ASICs are depicted exemplarily for each of the optical units. However, the communication scheme according to the present invention can be used with any suitable number of transceiver elements.

As shown in FIG. 20, upon a command from the principal micro controller sent on the data-out line, the principal ASIC#1.1 emits radiation towards the companion optical unit. At the companion optical unit the ASIC#1.1' is already prepared to receive an optical signal which is indicated by the block "sensing". An electrical "answer" is sent from ASIC#1.1' towards the companion micro controller on the data-in line. According to the present invention, no electrical signals are transmitted on the bus lines at a particular ASIC while the respective ASIC is in a sensing mode. This "silence" is advantageous because every communication on the bus lines requires digital signal transitions on the ASICs pins. Since the photo diodes (or any other optical receiver) are connected to a very sensitive input, any digital transition at the ASIC's pins may cause disturbances on the photo diode signal.

FIG. 20 furthermore illustrates an interleaving signaling of the individual ASICs which is also known as pipelining technique. Although each ASIC needs a total of five time slots from receiving the command until sending the answer, the interleaving timing sequence according to FIG. 20 allows for the emission of an optical signal in each time slot.

For the principal and the companion optical unit, respectively, a sensing phase with silence on the bus lines alternates with an optical emitting and electrically communicating phase in a way that always one optical unit is actively transmitting while the other is in a sensing state.

The use of the terms "a" and "an" and "the" and similar referents in the context of describing the invention (especially in the context of the following claims) are to be construed to cover both the singular and the plural, unless otherwise indicated herein of clearly contradicted by context. The terms "comprising," "having" "including," and "containing" are to be construed as open-ended terms (i.e., meaning "including, but not limited to,") unless of noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the invention:

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A photoelectric barrier, comprising:
a plurality of optical units, wherein each optical unit includes:
at least one optical sender;
at least one optical receiver;
a control element, wherein said control element comprises a driver unit for driving said at least one optical sender to emit radiation and a receiver unit for sensing and evaluating electrical signals generated by said at least one optical receiver, and
a communication bus extending between the control elements for each of the plurality of optical units, wherein the control element commands the receiver unit to operate in a sensing state and the control element prevents signal transmission on the communication bus when the receiver unit is in the sensing state.

2. The photoelectric barrier of claim 1, wherein said control element is fabricated as an integrated circuit.

3. The photoelectric barrier of claim 1, wherein said driver unit is operable to adjust an emission intensity of said optical sender in response to a first setting signal.

4. The photoelectric barrier of claim 3, wherein said first setting signal is dependent on one of an ambient temperature and an internal temperature.

5. The photoelectric barrier of claim 1, wherein said receiver unit is operable to adjust a receiver sensitivity of said optical receiver in response to a second setting signal.

6. The photoelectric barrier of claim 3, wherein said first setting signal is received as an optical signal detected by the optical receiver or as an electrical signal received via the communication bus.

7. The photoelectric barrier of claim 1, wherein said receiver unit of the control element comprises a comparator to evaluate a radiation intensity value measured by the optical receiver by comparing the measured radiation intensity value to a predefined threshold value.

8. The photoelectric barrier of claim 7, wherein a warning means is actuated when the measured radiation intensity is below said predefined threshold value.

9. The photoelectric barrier of claim 1, further comprising at least one electrical input terminal and at least one output terminal for being connected to the communication bus.

10. The photoelectric barrier of claim 9, wherein said transceiver element is operable to transmit optical signals via said optical sender in response to electrical signals received at said at least one input terminal and to transmit electrical signals via said output terminal in response to optical signals detected by said receiver element.

11. The photoelectric barrier of claim 1, wherein said transceiver element is operable to emit, receive, and evaluate coded optical pulses for performing an optical communication.

12. A photoelectric barrier for monitoring a surveillance area, said barrier comprising:
at least one first optical unit including a plurality of transceiver elements, wherein each transceiver element includes:
at least one optical sender;
at least one optical receiver;
a control element, wherein said control element comprises a driver unit for driving said at least one optical sender to emit radiation and a receiver unit for sensing and evaluating electrical signals generated by said at least one optical receiver; and
a communication bus extending between the control elements of each of the plurality of transceiver elements; and
at least one of a second optical unit and a reflective unit, wherein each of said control elements is operable to control the at least one optical sender of one of the optical units to emit radiation towards a corresponding optical receiver of another one of the optical units, wherein no signal transmission is performed on the communication bus during a time frame in which the transceiver element receives optical radiation.

13. The photoelectric harrier of claim 12, wherein said transceiver elements are operable to perform a bi-directional optical communication between the first and second optical unit.

14. The photoelectric barrier of claim 12, wherein said driver unit is operable to receive a first setting signal from said receiver unit, and wherein said driver unit is operable to adjust an emission intensity of said optical sender in response to a measured emission intensity detected by the corresponding opposing optical receiver.

15. The photoelectric barrier of claim 14, wherein said control elements comprise a comparator circuit for comparing a measured emission intensity to a least one predefined threshold value.

16. The photoelectric barrier of claim 15, wherein said control elements are operable to adjust, in response to the result of said comparison, a sensitivity of the optical receiver connected thereto.

17. The photoelectric barrier of claim 15, wherein said control elements are operable to transmit, in response to the result of said comparison, said first setting signal to the corresponding opposing transceiver element.

18. The photoelectric barrier of claim 12, wherein at least one of the optical units has an interface element for electrically connecting the optical unit to an external electrical circuit.

19. The photoelectric barrier of claim 12, having at least one central controller, wherein a comparator is provided to evaluate a radiation intensity value measured by the optical receiver by comparing same to a predefined threshold value, and wherein a warning means is provided for being actuated, if the measured radiation intensity is below said predefined threshold value.

* * * * *

UNITED STATES PATENT AND TRADEMARK OFFICE
CERTIFICATE OF CORRECTION

PATENT NO. : 9,628,183 B2
APPLICATION NO. : 14/289045
DATED : April 18, 2017
INVENTOR(S) : Meinherz et al.

It is certified that error appears in the above-identified patent and that said Letters Patent is hereby corrected as shown below:

In the Claims

Claim 13, Column 14, Line 22, Replace "harrier" with "barrier".

Signed and Sealed this
Twelfth Day of December, 2017

Joseph Matal
*Performing the Functions and Duties of the
Under Secretary of Commerce for Intellectual Property and
Director of the United States Patent and Trademark Office*